US008408179B2

United States Patent
Manganaro

(10) Patent No.: US 8,408,179 B2
(45) Date of Patent: Apr. 2, 2013

(54) ROTARY PISTON COMBUSTION ENGINE

(75) Inventor: Mariano Manganaro, Gorizia (IT)

(73) Assignee: Valmax S.R.L., Gorizia (IT)

( * ) Notice: Subject to any disclaimer, the term of this patent is extended or adjusted under 35 U.S.C. 154(b) by 581 days.

(21) Appl. No.: 12/452,334

(22) PCT Filed: Jun. 25, 2008

(86) PCT No.: PCT/EP2008/058057
§ 371 (c)(1),
(2), (4) Date: Feb. 3, 2010

(87) PCT Pub. No.: WO2009/000844
PCT Pub. Date: Dec. 31, 2008

(65) Prior Publication Data
US 2010/0139612 A1    Jun. 10, 2010

(30) Foreign Application Priority Data

Jun. 26, 2007  (IT) .............................. UD2007A0115

(51) Int. Cl.
*F02B 53/00* (2006.01)
*F01C 1/00* (2006.01)
*F04C 18/00* (2006.01)
*F04C 2/00* (2006.01)

(52) U.S. Cl. ........................... 123/245; 123/243; 418/36

(58) Field of Classification Search .................. 123/243, 123/245, 234, 236; 418/36; 74/437, 436, 74/435, 393; 475/198
See application file for complete search history.

(56) References Cited

U.S. PATENT DOCUMENTS 3,256,866 A    6/1966 Bauer ........................... 123/245
3,398,643 A *  8/1968 Hans Schudt ................... 418/36
(Continued)

FOREIGN PATENT DOCUMENTS

DE    26 11 775 A1    9/1977
DE    30 07 681 A1    9/1981
(Continued)

OTHER PUBLICATIONS

Machine Translation of the reference to August (Pub. No. DE 26 11 775 A1), Published on Sep. 22, 1977.*
(Continued)

*Primary Examiner* — Thai Ba Trieu
(74) *Attorney, Agent, or Firm* — Hedman & Costigan, P.C.; James V. Costigan

(57) ABSTRACT

Combustion engine (10) comprising a stator (11) provided with a compartment (16), inside which a rotor (20) is mounted rotatable, which comprises two parts (22, 23) each comprising a peripheral surface (47) and articulated one with respect to the other and both mounted rotatable, around the same axis of rotation (21) substantially coaxial with the compartment (16). The combustion engine (10) comprises kinematisms (60) to coordinate cyclically the rotations of the two parts (22, 23) around the axis of rotation (21), so that each of the parts (22, 23) accelerates or decelerates synchronously with respect to the other, while still both rotating in the same direction and at the same average angular velocity. Each part (22, 23) comprises a first radial arm (22a, 23a, 22b, 23b) provided with a first lateral surface (45) orthogonal to the plane of rotation, to cooperate cyclically with a corresponding second lateral surface (46), also substantially orthogonal to the plane of rotation, a second adjacent radial arm (22a, 23a, 22b, 23b) to define a combustion chamber (31, 32, 33, 34). The first lateral surface (45) comprises a bevel (36, 37, 38, 39) oriented in the direction of the rotation, to define, with the second lateral surface (46) of the adjacent radial arm (22a, 23a, 22b, 23b), a combustion pre-chamber (40, 41, 42, 43) continuous with the combustion chamber (31, 32, 33, 34).

31 Claims, 13 Drawing Sheets

U.S. PATENT DOCUMENTS

| | | | | |
|---|---|---|---|---|
| 4,844,708 A | * | 7/1989 | Lopez | 418/36 |
| 4,901,694 A | * | 2/1990 | Sakita | 418/36 |
| 5,133,317 A | * | 7/1992 | Sakita | 418/36 |
| 6,446,595 B1 | * | 9/2002 | Sakita | 123/245 |
| 6,457,451 B1 | * | 10/2002 | Sakita | 123/245 |
| 6,457,452 B1 | * | 10/2002 | Sakita | 123/245 |

FOREIGN PATENT DOCUMENTS

| | | |
|---|---|---|
| DE | 39 26 061 A1 | 2/1991 |
| DE | 42 09 443 A1 | 9/1993 |
| FR | 2 689 564 A | 10/1993 |
| RU | 2 097 586 C1 | 11/1997 |

OTHER PUBLICATIONS

PCT Search Report dated Jan. 8, 2009.

* cited by examiner

US 8,408,179 B2

ROTARY PISTON COMBUSTION ENGINE

FIELD OF THE INVENTION

The present invention concerns a combustion engine comprising a stator having a substantially cylindrical compartment inside which a rotor is able to rotate, which comprises two parts that function as a piston, or two impellers which autonomously create the variations in volume using the walls of the disk from which the trapezoid pistons protrude. The two parts of the rotor are articulated one with respect to the other and are both mounted rotatable around the same axis of rotation substantially coaxial with the compartment of the stator. A kinematism is connected to the two pistons to coordinate cyclically their rotations around the same axis of rotation, so that each of the two pistons accelerates or decelerates synchronously with respect to the other, while they still both rotate in the same direction and at the same average angular speed. The two pistons also function as opening/closing valves for two intake and exhaust apertures, or gaps, communicating with the cylindrical compartment. The engine according to the present invention can be applied in any industrial sector, and is advantageously usable as a propulsion system for any means of transport, whether by land, sea or air.

BACKGROUND OF THE INVENTION

The most widespread internal combustion engines, both Otto cycle and Diesel, are provided with one or more pistons mobile axially and alternately, each inside its own cylinder provided with a combustion chamber, connected by means of a piston rod to the crank or elbow of a drive shaft.

Some decades ago, a combustion engine was also proposed in which a single rotary piston, or rotor, was disposed in a substantially cylindrical compartment, made in a stator.

In this known engine the rotary piston comprises a body having an epicycloidal profile defining a first plurality of N lobes, while the stator is provided with a second plurality of N+1 lobes. The piston is able to rotate eccentrically in the compartment of the stator, so that its N lobes interact cyclically with the N+1 lobes of the stator, in each of which a corresponding combustion chamber is made.

Two disks are also attached laterally to the rotor, and are provided with apertures able to move cyclically in correspondence with the intake and exhaust pipes to define the cycles of the engine.

This known engine, due to its low efficiency, high fuel consumption and many problems of wear, especially of the piston lobes which move cyclically into contact with those of the stator, has not been widely adopted and has been almost abandoned.

A combustion engine with rotary pistons is also known in which the compartment of the stator is substantially cylindrical and the rotor comprises two articulated parts mounted rotatable around the same axis of rotation, the latter substantially coaxial with the compartment.

In this type of known combustion engine, kinematic means are also provided able to coordinate cyclically the rotations of the two parts around the axis of rotation, so that each of them accelerates or decelerates synchronously with respect to the other, while still both rotating in the same direction and at the same average angular velocity.

Purpose of the present invention is to achieve a combustion engine which is simple, reliable, long-lasting and which has good energy performance.

The Applicant has devised, tested and embodied the combustion engine according to the present invention to overcome the shortcomings of known engines and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose, the combustion engine according to the present invention comprises a stator provided with a compartment inside which a rotor is mounted rotatable, and in turn comprises two parts articulated with respect to each other, both mounted rotatable around the same axis of rotation substantially coaxial with said compartment. Kinematic means are provided to coordinate cyclically the rotations of the two parts of the rotor around the common axis of rotation, so that each of the two parts accelerates or decelerates with respect to the other, while still both rotating in the same direction and at the same average angular velocity.

According to a characteristic feature of the present invention, each of the two parts of the rotor comprises at least a radial arm provided with a first lateral surface able to cooperate cyclically with a corresponding second lateral surface of an adjacent radial arm to define a combustion chamber.

The first lateral surface comprises a bevel oriented in the direction of rotation, and able to define, with the second lateral surface of the adjacent radial arm, a combustion pre-chamber adjacent to the combustion chamber.

With the present invention, the first surface, provided with the bevel, has all in all a larger surface than the second surface of the adjacent radial arm, thus promoting the formation of a greater rotary moment on the corresponding radial arm with respect to the other.

In this way, the correct movement of each part of the rotor is guaranteed, generating different accelerations, which then determine a correct expansion with consequent rotation of the drive shaft.

Advantageously, the bevel is made in correspondence with an external edge defined between the first surface and a peripheral surface of the radial arm.

The bevel is thus in a radial position as far as possible from the axis of rotation of the relative radial arm, so as to exploit optimally the forces generated by combustion, since in the first instants the greatest pressure is found in the volume farthest from the center of rotation, generating a greater moment.

Moreover, the bevel interrupts the linearity of the chamber, creating a determinate turbulence in the mixture, which promotes good propagation of the flame, and reduces the danger of detonation.

According to a variant, the bevel has an amplitude equal to an angle β comprised between about 25° and about 45°, advantageously about 31°.

According to another variant, the bevel defines a compression ratio of 1:10, between the combustion phase and the phase of maximum expansion.

According to another variant, the two adjacent radial arms are angularly positioned with respect to each other to define the amplitude of the combustion chamber which, in the compressed condition, has an angle α comprised between about 2° and about 10°, advantageously about 6°. Moreover, to promote optimum efficiency of combustion, the radial arms have a reciprocal angular position which defines, during the combustion phase, an angle of spark lead. In fact, combustion is programmed to take place when one of the radial arms is at an angle comprised between about −22° and about −7°, and the adjacent radial arm is at an angle comprised between about −15° and about −8°, with respect to the angular combustion point. The decision to make combustion occur earlier or later inside said angular ranges is taken on each occasion, according to the number of revs of the engine operating normally, in order to optimize the power delivered.

Advantageously, the two parts of the rotor comprise two pistons angularly offset one with respect to the other and disposed substantially "cross-wise" and articulated "scissor-wise", so that they each define two radial arms which lie substantially on the same plane perpendicular to said axis of rotation. Advantageously, the two pistons are the same length and cross in their center line. In particular, the length of each piston is equal to the diameter of the central compartment.

Each rotary piston is shaped so as to comprise a central part, by means of which it is pivoted on the common axis of rotation, and from which the radial arms extend, on diametrically opposite sides. The two pistons can thus both rotate in the same direction, around their common axis of rotation, at different angular velocities, but controlled by said kinematic means, so that cyclically the radial arms of one piston reciprocally approach or are distanced from those of the other piston.

The thickness of each radial arm of the two pistons is substantially equal to the width of the central compartment of the stator. The bevel extends advantageously for the whole thickness of each arm.

The four arms with relative bevels of the two rotary pistons thus define four chambers and four pre-chambers able to compress and expand cyclically so that each functions, during the complete rotation of the pistons, as a combustion chamber and combustion pre-chamber. In each of the four chambers and four pre-chambers first of all a mixture of air and fuel is introduced (intake phase), then the mixture is combusted, with or without the aid of a sparking plug (combustion phase), with consequent expansion and then the combusted gases are expelled from the chambers (exhaust phase).

The sparking plug is advantageously inclined by an angle comprised between about 20° and about 30°, advantageously about 25°, with respect to a plane orthogonal to the rotation and passing through the center of rotation and the angular combustion point.

The peripheral walls of the four arms are also able to cooperate cyclically with a single intake aperture and with a single exhaust aperture, so that the arms of the pistons also function as intake and exhaust valves.

With every complete revolution of the rotor, or of the two pistons, we thus obtain four complete cycles of intake, combustion, expansion and exhaust, so that a one-cylinder engine according to the present invention performs the functions of and is therefore comparable to an engine of the alternative type with eight cylinders, if it is four-stroke, or with four cylinders, if it is two-stroke.

The kinematic means that connect the two rotary pistons with each other advantageously comprise at least a first pair of elliptical gears, whose transmission ration is such as to make the radial arms of the two pistons approach/separate cyclically, and consequently to make the four chambers defined by said radial arms compress/expand.

Advantageously, the transmission ration between the two rotary pistons and the kinematic means is always 2:1.

The kinematic means advantageously also comprise other elliptical gears connected or directly engaging with those of the first pair, which are in turn connected with a single output shaft of the engine, in order to re-balance the instantaneous speed of rotation of the two pistons and make it substantially continuous and proportionate to the average speed of rotation of the pistons.

BRIEF DESCRIPTION OF THE DRAWINGS

These and other characteristics of the present invention will become apparent from the following description of some preferential forms of embodiment, given as a non-restrictive example with reference to the attached drawings wherein.

DETAILED DESCRIPTION OF SOME PREFERENTIAL FORMS OF EMBODIMENT

Figure 1:
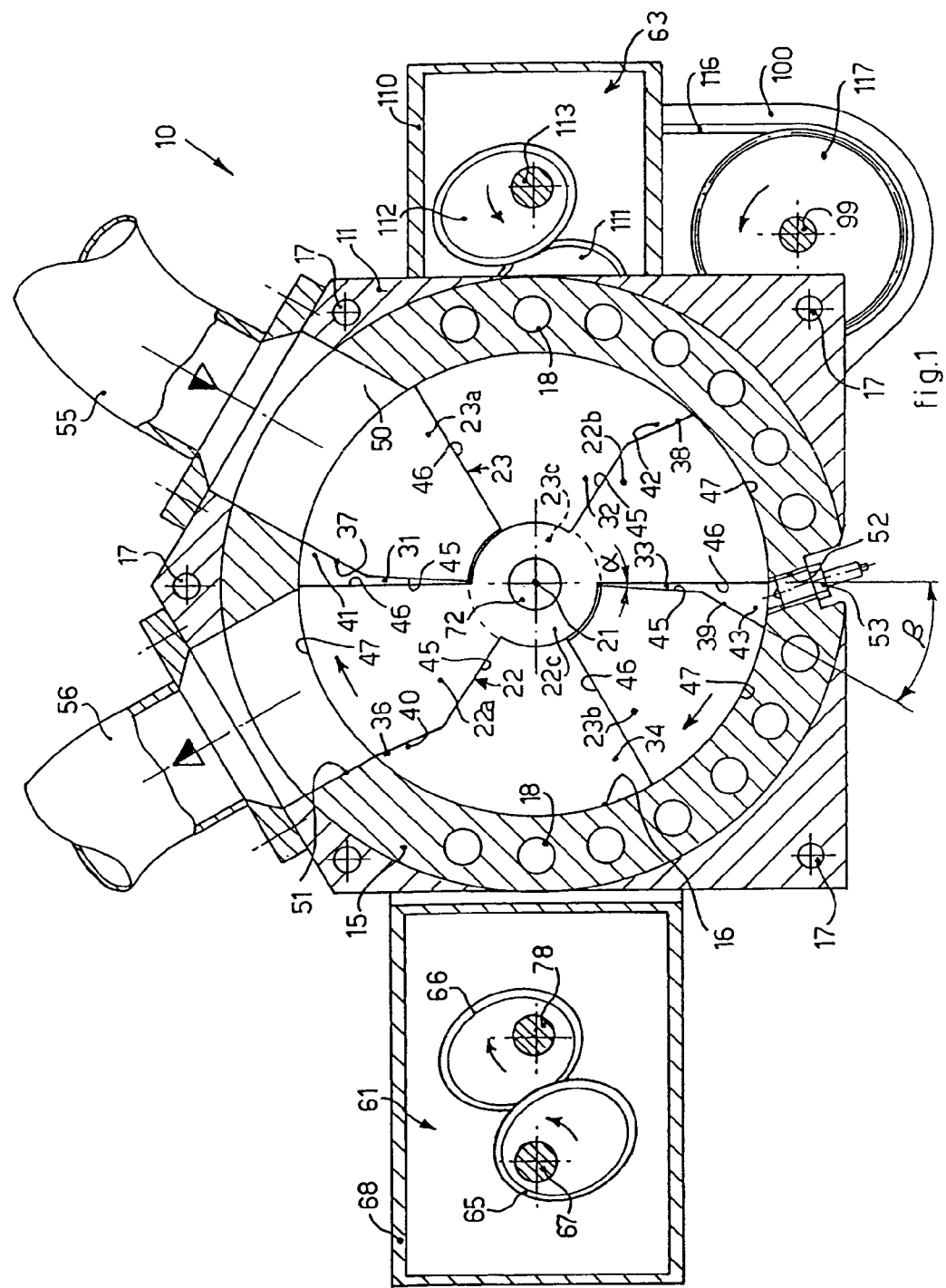
FIG. 1 is a front view, partly in section, of a combustion engine according to the present invention in a first operating position.
Figure 2:
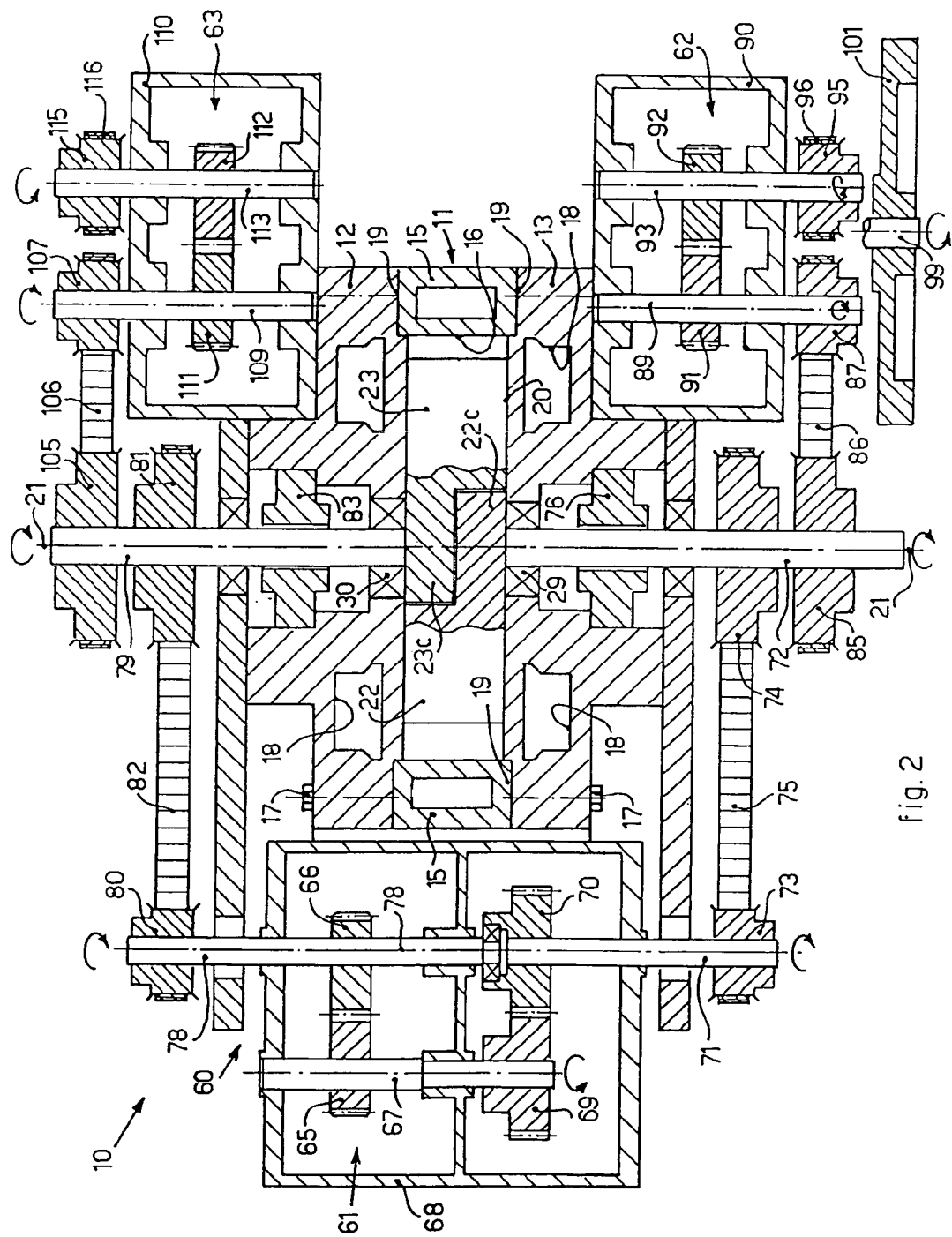
FIG. 2 is a view from above, in section, of the combustion engine in FIG. 1.
Figure 3:
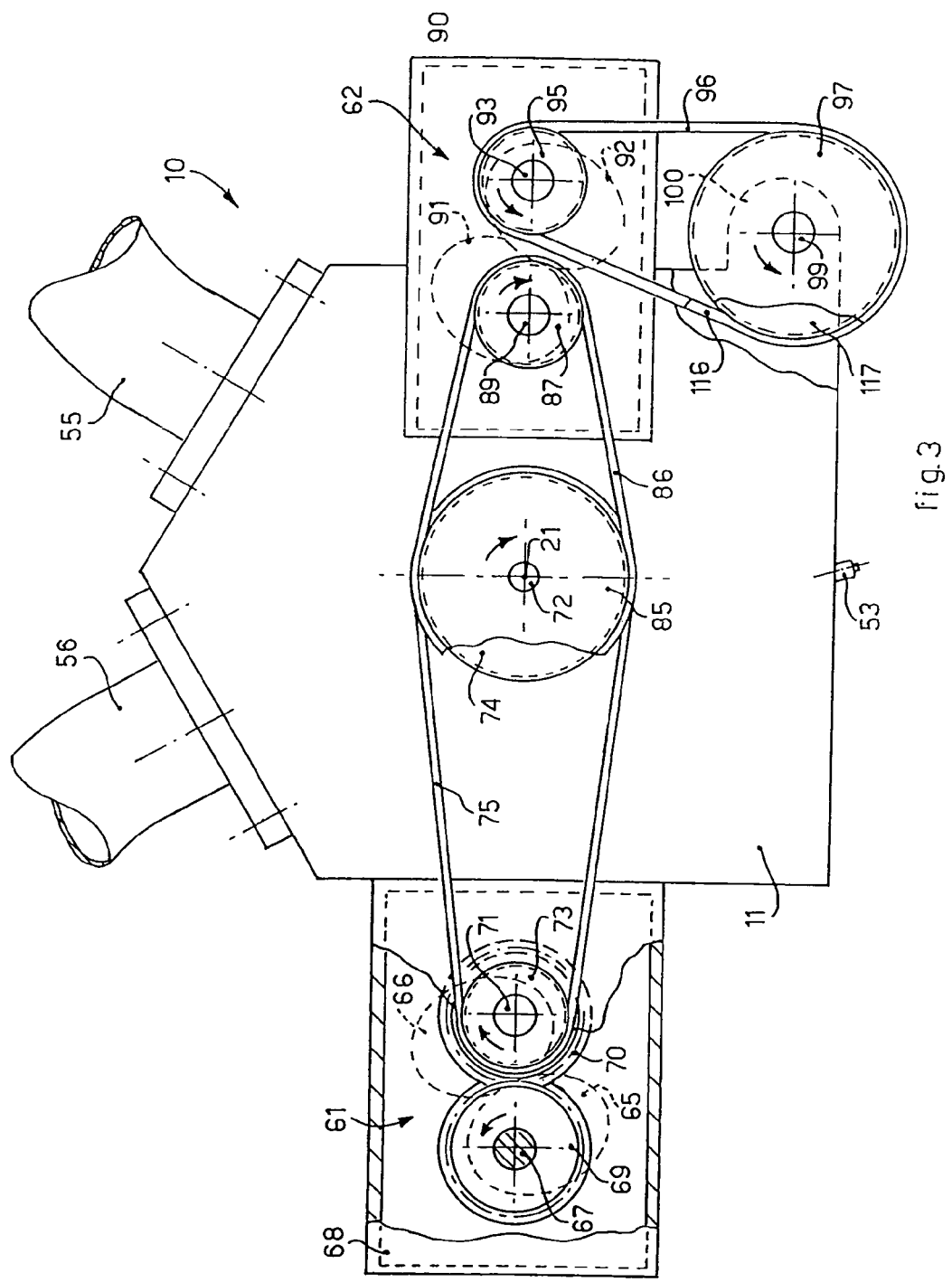
FIG. 3 is a front and schematized view of the combustion engine in FIG. 1.

With reference to FIGS. 1, 2 and 3, a combustion engine 10 according to the present invention comprises a stator 11 essentially consisting of two metal lateral flanges 12 and 13, parallel to each other, and of a central spacer 15, also made of metal and shaped so as to define internally a cylindrical compartment 16. The flanges 12, 13 and the spacer 15 are provided internally with cooling channels 18 inside which, in any known manner, any cooling liquid is able to circulate, such as water or suchlike.

The two flanges 12, 13 and the spacer 15 are held together, with sealing packings 19 of a known type interposed, by means of bolts 17.

Inside the cylindrical compartment 16, two metal pistons 22 and 23 which constitute a rotor 20 are mounted rotatably, around the same axis of rotation.

The piston 22 is shaped so as to comprise a central part 22c and two radial arms 22a and 22b, diametrically opposite. In the same way, the piston 23 is shaped so as to comprise a central part 23c and two radial arms 23a and 23b, diametrically opposite.

Figure 7:
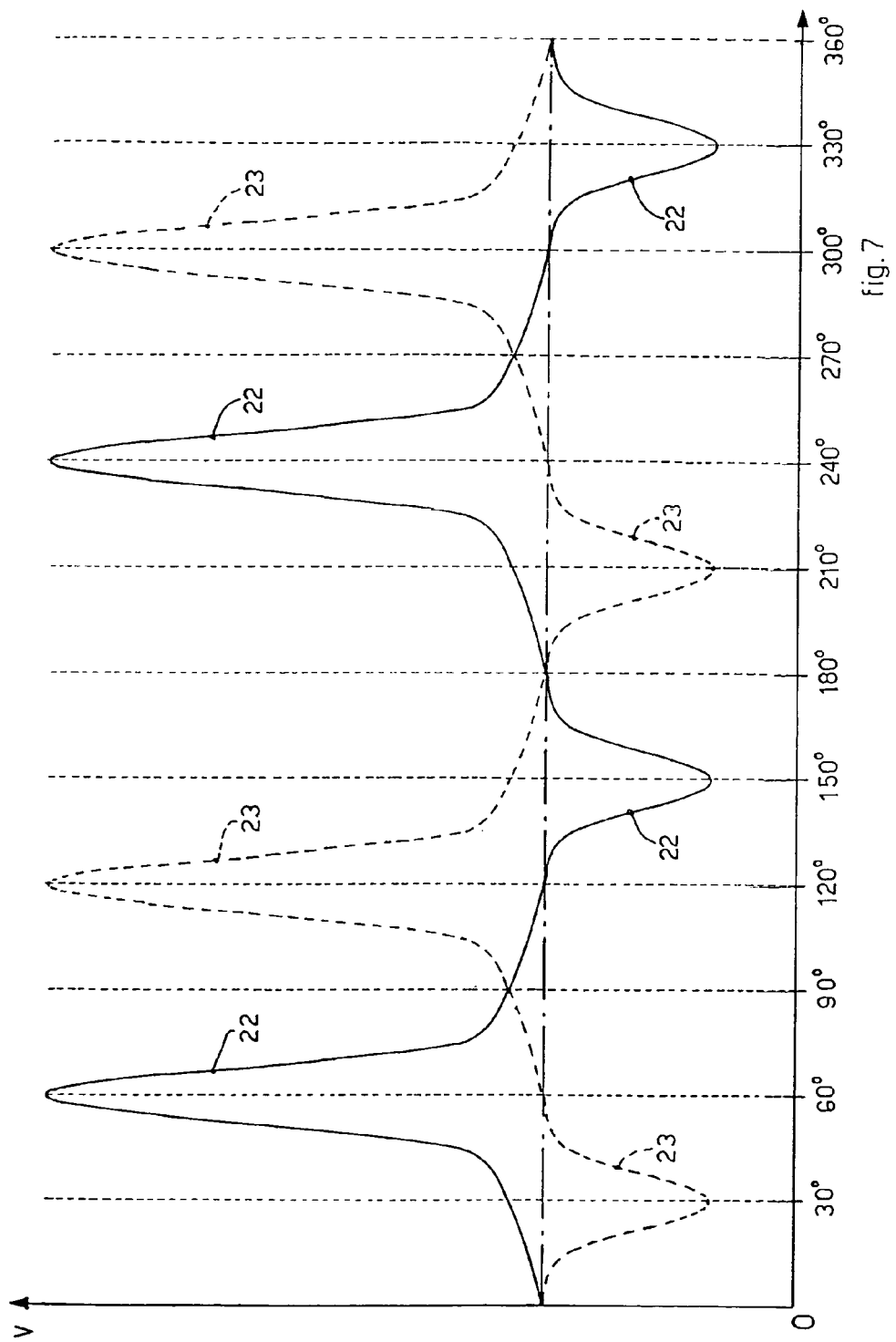
FIG. 7 is a diagram showing the development of the angular velocity V of each of the two pistons of the engine according to the present invention according to their angular position expressed in degrees.

The radial arms 22a, 22b, 23a, and 23b are the same width as the cylindrical compartment 16, whereas the central parts 22c and 23c are half the width. The two pistons 22 and 23 are rotatable on ball bearings 29, respectively 30, mounted on the lateral flanges 13, respectively 12 of the stator 11. In this way, each piston 22 and 23 can rotate freely and autonomously with respect to the axis of rotation 21 and can accelerate or decelerate angularly with respect to the other, while the two pistons 22 and 23 still rotate in the same direction and at the same average angular velocity Vm (FIG. 7).

The four radial arms 22a, 23a, 22b, and 23b of the pistons 22 and 23 are angularly offset with respect to each other, so as thus to define four combustion chambers 31, 32, 33 and 34. As will be explained in more detail hereafter, the two pistons 22 and 23 are able to rotate at different angular velocities, so that the arms 22a and 22b of the piston 22 are able to cyclically approach and separate from the arms 23a and 23b of the piston 23, with a scissor-like movement, so that while two diametrically opposite chambers (for example chambers 31 and 33) compress, the other two diametrically opposite chambers (for example chambers 32 and 34) expand.

In the compressed position of the chambers 31, 32, 33 and 34, they have an aperture of an angle α, selectively variable between about 2° and about 10°, advantageously 6°.

The radial arms 22a, 23a, 22b, and 23b are angularly connected so as to compress reciprocally in correspondence with the point of combustion, defined in the case of a petrol engine by one or more sparking plugs 53. However, the combustion is commanded with a determinate spark lead with respect to the angular positioning at 0° of the two radial arms compressed at that moment, since the flame takes a determinate time before being propagated and before burning the whole volume of the combustion chamber 31, 32, 33 and 34.

In fact, according to the invention, combustion occurs with a first of the two radial arms angularly positioned between about −22° and about −7°, whereas the other radial arm is angularly positioned between about −15° and about −6°, with respect to the angular positioning at 0° of combustion.

The angular position of the radial arms at which combustion is made to occur is chosen according to the number of revs of the engine, so as to optimize combustion, and the performance of the engine itself.

The following Table 1 shows some examples of calculating the reciprocal angular positioning of the two radial arms, also in relation to the reciprocal positioning of relative gears, described hereafter.

TABLE 1

| Piston rotation angle | Piston rotation angle | Arm rotation angle | Arm rotation angle | Angle of slowing arm | Angle of accelerating arm | Distance arms chord |
|---|---|---|---|---|---|---|
| 0 | 0 | 0 | 0 | −60 | −120 | −115.17 |
| 1.233 | 1.248 | 0.616 | 0.624 | −59.384 | −119.376 | −115.16 |
| 2.451 | 2.514 | 1.226 | 1.257 | −58.774 | −118.743 | −115.11 |
| 3.657 | 3.797 | 1.828 | 1.898 | −58.172 | −118.102 | −115.04 |
| 4.850 | 5.099 | 2.425 | 2.549 | −57.575 | −117.451 | −114.93 |
| 6.032 | 6.422 | 3.016 | 3.211 | −56.984 | −116.789 | −114.80 |
| 7.204 | 7.767 | 3.602 | 3.883 | −56.398 | −116.117 | −114.63 |
| 8.367 | 9.135 | 4.183 | 4.568 | −55.817 | −115.432 | −114.43 |
| 9.521 | 10.529 | 4.761 | 5.264 | −55.239 | −114.736 | −114.20 |
| 10.669 | 11.949 | 5.334 | 5.975 | −54.666 | −114.025 | −113.94 |
| 11.810 | 13.398 | 5.905 | 6.699 | −54.095 | −113.301 | −113.65 |
| 12.947 | 14.878 | 6.473 | 7.439 | −53.527 | −112.561 | −113.32 |
| 14.079 | 16.391 | 7.040 | 8.196 | −52.960 | −111.804 | −112.95 |
| 15.209 | 17.939 | 7.604 | 8.969 | −52.396 | −111.031 | −112.55 |
| 16.336 | 19.524 | 8.168 | 9.762 | −51.832 | −110.238 | −112.11 |
| 17.463 | 21.150 | 8.732 | 10.575 | −51.268 | −109.425 | −111.63 |
| 18.590 | 22.819 | 9.295 | 11.410 | −50.705 | −108.590 | −111.11 |
| 19.719 | 24.535 | 9.860 | 12.267 | −50.140 | −107.733 | −110.55 |
| 20.851 | 26.301 | 10.426 | 13.150 | −49.574 | −106.850 | −109.94 |
| 21.988 | 28.121 | 10.994 | 14.061 | −49.006 | −105.939 | −109.28 |
| 23.130 | 30.000 | 11.565 | 15.000 | −48.435 | −105.000 | −108.58 |
| 24.280 | 31.943 | 12.140 | 15.971 | −47.860 | −104.029 | −107.82 |
| 25.440 | 33.955 | 12.720 | 16.977 | −47.280 | −103.023 | −107.00 |
| 26.611 | 36.042 | 13.305 | 18.021 | −46.695 | −101.979 | −106.12 |
| 27.796 | 38.213 | 13.898 | 19.107 | −46.102 | −100.893 | −105.17 |
| 28.997 | 40.476 | 14.499 | 20.238 | −45.501 | −99.762 | −104.15 |
| 30.218 | 42.840 | 15.109 | 21.420 | −44.891 | −98.580 | −103.06 |
| 31.463 | 45.317 | 15.731 | 22.658 | −44.269 | −97.342 | −101.87 |
| 32.734 | 47.920 | 16.367 | 23.960 | −43.633 | −96.040 | −100.59 |
| 34.038 | 50.667 | 17.019 | 25.334 | −42.981 | −94.666 | −99.21 |
| 35.380 | 53.578 | 17.690 | 26.789 | −42.310 | −93.211 | −97.70 |
| 36.769 | 56.678 | 18.384 | 28.339 | −41.616 | −91.661 | −96.06 |
| 38.213 | 60.000 | 19.107 | 30.000 | −40.893 | −90.000 | −94.26 |
| 39.727 | 63.586 | 19.864 | 31.793 | −40.136 | −88.207 | −92.27 |
| 41.328 | 67.495 | 20.664 | 33.748 | −39.336 | −86.252 | −90.06 |
| 43.043 | 71.810 | 21.521 | 35.905 | −38.479 | −84.095 | −87.56 |
| 44.910 | 76.658 | 22.455 | 38.329 | −37.545 | −81.671 | −84.70 |
| 46.997 | 82.251 | 23.499 | 41.125 | −36.501 | −78.875 | −81.34 |
| 49.436 | 88.997 | 24.718 | 44.499 | −35.282 | −75.501 | −77.20 |
| 52.567 | 97.946 | 26.283 | 48.973 | −33.717 | −71.027 | −71.62 |
| 60.000 | 120.000 | 30.000 | 60.000 | −30.000 | −60.000 | −57.59 |
| 67.433 | 142.054 | 33.717 | 71.027 | −26.283 | −48.973 | −43.55 |
| 70.564 | 151.003 | 35.282 | 75.501 | −24.718 | −44.499 | −37.97 |
| 73.003 | 157.749 | 36.501 | 78.875 | −23.499 | −41.125 | −33.83 |
| 75.090 | 163.342 | 37.545 | 81.671 | −22.455 | −38.329 | −30.47 |
| 76.957 | 168.190 | 38.479 | 84.095 | −21.521 | −35.905 | −27.61 |
| 78.672 | 172.505 | 39.336 | 86.252 | −20.664 | −33.748 | −25.11 |
| 80.273 | 176.414 | 40.136 | 88.207 | −19.864 | −31.793 | −22.90 |
| 81.787 | 180.000 | 40.893 | 90.000 | −19.107 | −30.000 | −20.91 |
| 83.231 | 183.322 | 41.616 | 91.661 | −18.384 | −28.339 | −19.11 |

TABLE 1-continued

| Piston rotation angle | Piston rotation angle | Arm rotation angle | Arm rotation angle | Angle of slowing arm | Angle of accelerating arm | Distance arms chord | |
|---|---|---|---|---|---|---|---|
| 84.620 | 186.422 | 42.310 | 93.211 | −17.690 | −26.789 | −17.47 | |
| 85.962 | 189.333 | 42.981 | 94.666 | −17.019 | −25.334 | −15.96 | |
| 87.266 | 192.080 | 43.633 | 96.040 | −16.367 | −23.960 | −14.58 | |
| 88.537 | 194.683 | 44.269 | 97.342 | −15.731 | −22.658 | −13.30 | Variable |
| 89.782 | 197.160 | 44.891 | 98.580 | −15.109 | −21.420 | −12.11 | spark |
| 91.003 | 199.524 | 45.501 | 99.762 | −14.499 | −20.238 | −11.02 | lead |
| 92.204 | 201.787 | 46.102 | 100.893 | −13.898 | −19.107 | −10.00 | |
| 93.389 | 203.958 | 46.695 | 101.979 | −13.305 | −18.021 | −9.05 | |
| 94.560 | 206.045 | 47.280 | 103.023 | −12.720 | −16.977 | −8.17 | |
| 95.720 | 208.057 | 47.860 | 104.029 | −12.140 | −15.971 | −7.35 | |
| 96.870 | 210.000 | 48.435 | 105.000 | −11.565 | −15.000 | −6.59 | |
| 98.012 | 211.879 | 49.006 | 105.939 | −10.994 | −14.061 | −5.89 | |
| 99.149 | 213.699 | 49.574 | 106.850 | −10.426 | −13.150 | −5.23 | |
| 100.281 | 215.465 | 50.140 | 107.733 | −9.860 | −12.267 | −4.62 | |
| 101.410 | 217.181 | 50.705 | 108.590 | −9.295 | −11.410 | −4.06 | |
| 102.537 | 218.850 | 51.268 | 109.425 | −8.732 | −10.575 | −3.54 | |
| 103.664 | 220.476 | 51.832 | 110.238 | −8.168 | −9.762 | −3.06 | |
| 104.791 | 222.061 | 52.396 | 111.031 | −7.604 | −8.969 | −2.62 | |
| 105.921 | 223.609 | 52.960 | 111.804 | −7.040 | −8.196 | −2.22 | Fixed spark |
| 107.053 | 225.122 | 53.527 | 112.561 | −6.473 | −7.439 | −1.85 | lead |
| 108.190 | 226.602 | 54.095 | 113.301 | −5.905 | −6.699 | −1.52 | |
| 109.331 | 228.051 | 54.666 | 114.025 | −5.334 | −5.975 | −1.23 | |
| 110.479 | 229.471 | 55.239 | 114.736 | −4.761 | −5.264 | −0.97 | |
| 111.633 | 230.865 | 55.817 | 115.432 | −4.183 | −4.568 | −0.74 | |
| 112.796 | 232.233 | 56.398 | 116.117 | −3.602 | −3.883 | −0.54 | |
| 113.968 | 233.578 | 56.984 | 116.789 | −3.016 | −3.211 | −0.37 | |
| 115.150 | 234.901 | 57.575 | 117.451 | −2.425 | −2.549 | −0.24 | |
| 116.343 | 236.203 | 58.172 | 118.102 | −1.828 | −1.898 | −0.13 | |
| 117.549 | 237.486 | 58.774 | 118.743 | −1.226 | −1.257 | −0.06 | |
| 118.767 | 238.752 | 59.384 | 119.376 | −0.616 | −0.624 | −0.01 | |
| 120.000 | 240.000 | 60.000 | 120.000 | 0.000 | 0.000 | 0.00 | |

Each radial arm 22a, 22b, 23a, and 23b is provided, on a first lateral wall 45, with a bevel 36, respectively 37, 38 and 39, oriented in the direction of rotation and extending over the whole height of the thickness of the relative radial arm 22a, 22b, 23a, and 23b. Each bevel 36, 37, 38 and 39 is able to define cyclically, with a corresponding second lateral wall 46 of the adjacent radial arm, a recess or pre-chamber 40, respectively 41, 42 and 43, of a predefined volume in each chamber 31, 32, 33 and 34. The four pre-chambers 40-43 define cyclically and temporally the corresponding combustion pre-chambers of the pistons 22 and 23.

In this way, the first lateral surface 45 of each radial arm 22a, 22b, 23a, and 23b has all in all a greater surface with respect to the second lateral surface 46 of the adjacent radial arm, thus promoting the formation of a greater rotary moment on the corresponding radial arm 22a, 22b, 23a, and 23b with respect to the other.

In this way, the correct reciprocal movement of each piston 22 and 23 of the rotor 20 is guaranteed, generating different accelerations, which then determine a correct expansion.

Each bevel 36, 37, 38 and 39 is made in correspondence with an external edge defined between the first lateral surface 45 and a peripheral surface 47 of each radial arm 22a, 22b, 23a, and 23b.

The bevel 36, 37, 38, 39 is thus in a radial position far from the axis of rotation 21 of the relative radial arm 22a, 22b, 23a, and 23b, so as to optimize the thrust effect of the forces generated by combustion.

Each bevel 36, 37, 38, 39 has an amplitude equal to an angle β comprised between about 25° and about 45°, advantageously about 31°, and defines a compression ratio of 1:10, between the combustion phase and the maximum expansion phase.

According to a variant, not shown, each bevel 36, 37, 38 and 39 has a curvilinear development.

According to another variant, each bevel 36, 37, 38 and 39 has a concave development.

According to another variant, each bevel 36, 37, 38 and 39 has a convex development.

On the stator 11, and in particular on the spacer 15, an intake aperture 50, an exhaust aperture 51 and a combustion aperture 52 are made, in which, if the fuel is petrol, a corresponding sparking plug 53 is able to be inserted.

The sparking plug 53 in this case is inclined by an angle comprised between about 20° and about 30°, advantageously about 25°, with respect to a plane orthogonal to the rotation and passing through the center of rotation and the angular combustion point.

It is clear that the plug 53 is not necessary if the fuel is diesel oil and combustion occurs by self-ignition (Diesel cycle).

The angular amplitude of the two apertures 50 and 51 is substantially equal to that of the external terminal part of each radial arm 22a, 22b, 23a, and 23b of the pistons 22 and 23; therefore, in their cyclical rotation, the latter also function as opening and closing elements, or valves, for the selective intake of the combustible mixture, through a feed pipe 55, and the selective expulsion of the combusted gases through an exhaust pipe 56.

The two pistons 22 and 23, although they are autonomously rotatable on the same axis of rotation 21, are connected to each other by means of a kinematism 60 outside the stator 11. The transmission ratio between the two pistons and the kinematism 60 is for example 2:1.

The kinematism 60, according to a first form of embodiment shown in FIGS. 1-6, essentially comprises three groups of gears 61, 62 and 63 which will be described hereafter.

Figure 10:
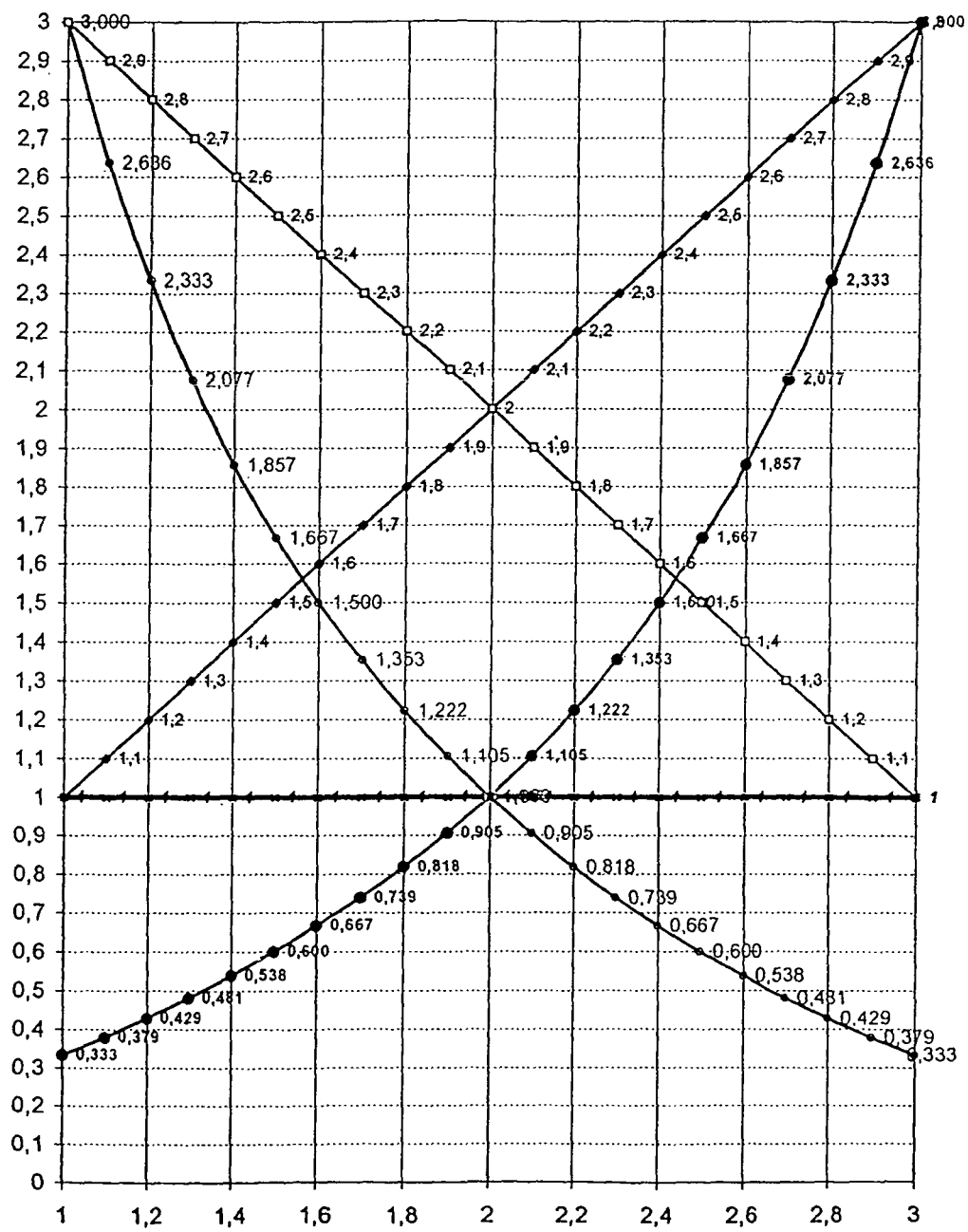
FIG. 10 is a diagram showing the succession of ratios of the elliptical wheels with relative final ratio at output.

In particular, the group of gears 61 comprises a first pair of elliptical gears 65 and 66, having a determinate transmission ration $RT_1$. To give an example, the transmission ratio $RT_1$ is advantageously variable within a complete revolution of the gears 65 and 66 between 1:3 and 3:1, as shown in the diagram in FIG. 10. It is clear that the transmission ratio $RT_1$ can be greater or smaller than this and defined according to the specification choices relating to the ratio between the angular velocities of each piston 22, 23.

Figure 11:
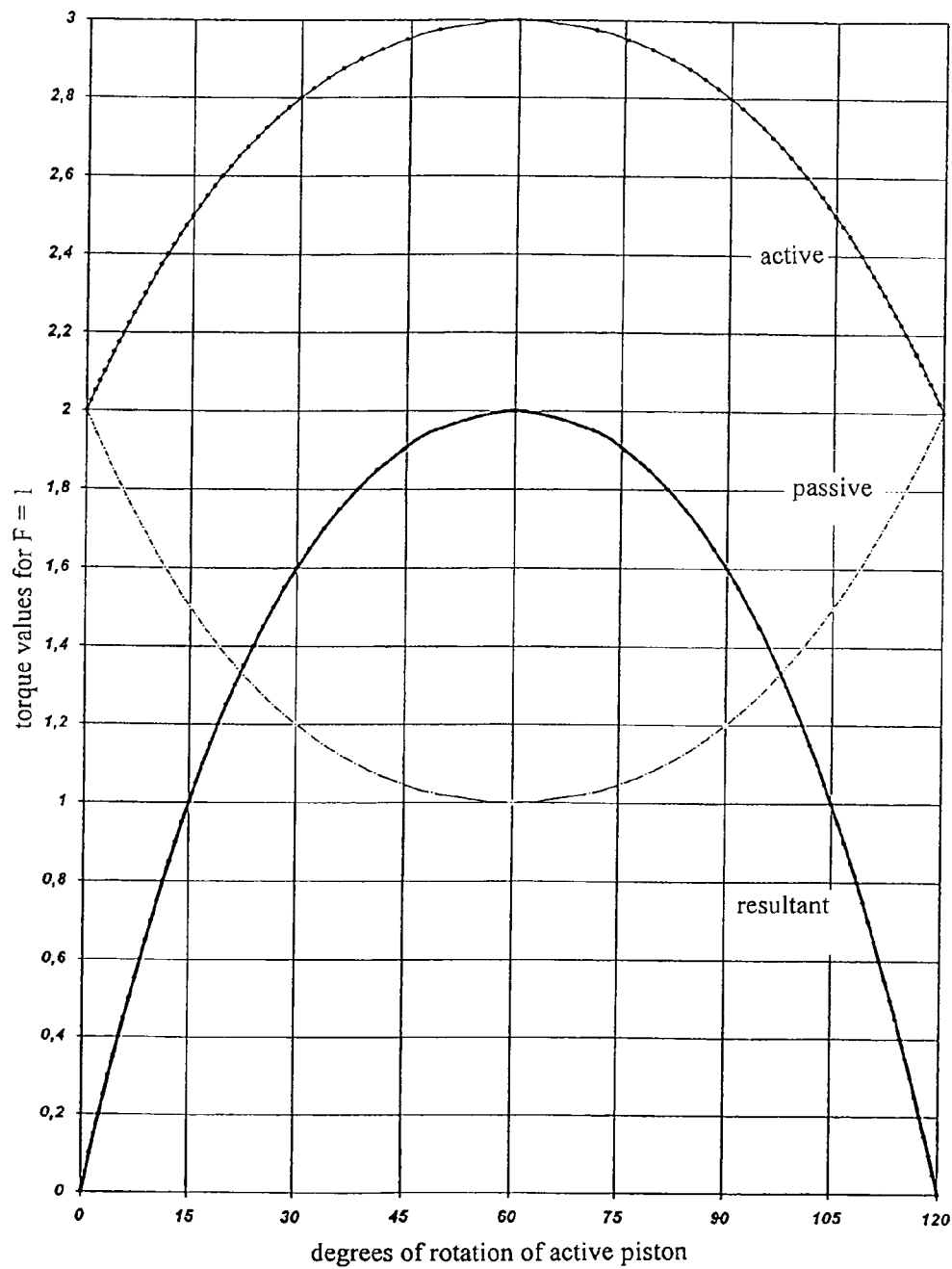
FIG. 11 is a diagram showing the variation in torque.

The diagram in FIG. 11 shows the advantage in mechanical performance deriving from having the pistons 22, 23 in a ratio of 2:1 with the pair of elliptical wheels 65, 66, exploiting the 240° between the two points "0" of the elliptical wheel, which translates into 120° of the piston (for elliptical with ratio 1:3).

The pressure generated by the combustion of the mixture generates a force in the combustion chamber in all directions, therefore having an active torque useful for the direction of rotation and a passive torque contrary to the direction of rotation. The difference between the two torques generated gives the active resultant which is the useful one.

In absolute values we have:
for 0° a torque equal to 0;
for 30° a torque equal to 1.6°;
for 60° a torque equal to 2°;
for 90° a torque equal to 1.6°; and
for 120° a torque equal to 0.

The following tables indicate the values of ratio in size between two elliptical wheels with a ratio respectively of 1:3 (table 2), 1:4 (table 3) and 1:5 (table 4).

TABLE 2

| Ratio x = A/B | Radius A | Radius B | Ratio y = B/A |
|---|---|---|---|
| 1 | 2 | 2 | 1 |
| 1.105263158 | 2.1 | 1.9 | 0.904761905 |
| 1.222222222 | 2.2 | 1.8 | 0.818181818 |
| 1.352941176 | 2.3 | 1.7 | 0.739130435 |
| 1.5 | 2.4 | 1.6 | 0.666666667 |
| 1.666666667 | 2.5 | 1.5 | 0.6 |
| 1.857142857 | 2.6 | 1.4 | 0.538461538 |
| 2.076923077 | 2.7 | 1.3 | 0.481481481 |
| 2.333333333 | 2.8 | 1.2 | 0.428571429 |
| 2.636363636 | 2.9 | 1.1 | 0.379310345 |
| 3 | 3 | 1 | 0.333333333 |
| 2.636363636 | 2.9 | 1.1 | 0.379310345 |
| 2.333333333 | 2.8 | 1.2 | 0.428571429 |
| 2.076923077 | 2.7 | 1.3 | 0.481481481 |
| 1.857142857 | 2.6 | 1.4 | 0.538461538 |
| 1.666666667 | 2.5 | 1.5 | 0.6 |
| 1.5 | 2.4 | 1.6 | 0.666666667 |
| 1.352941176 | 2.3 | 1.7 | 0.739130435 |
| 1.222222222 | 2.2 | 1.8 | 0.818181818 |
| 1.105263158 | 2.1 | 1.9 | 0.904761905 |
| 1 | 2 | 2 | 1 |

TABLE 3

| Ratio x = A/B | Radius A | Radius B | Ratio y = B/A |
|---|---|---|---|
| 1 | 2.5 | 2.5 | 1 |
| 1.083333333 | 2.6 | 2.4 | 0.923076923 |
| 1.173913043 | 2.7 | 2.3 | 0.851851852 |
| 1.272727273 | 2.8 | 2.2 | 0.785714286 |
| 1.380952381 | 2.9 | 2.1 | 0.724137931 |
| 1.5 | 3 | 2 | 0.666666667 |
| 1.631578947 | 3.1 | 1.9 | 0.612903226 |
| 1.777777778 | 3.2 | 1.8 | 0.5625 |
| 1.941176471 | 3.3 | 1.7 | 0.515151515 |
| 2.125 | 3.4 | 1.6 | 0.470588235 |
| 2.333333333 | 3.5 | 1.5 | 0.428571429 |
| 2.571428571 | 3.6 | 1.4 | 0.388888889 |
| 2.846153846 | 3.7 | 1.3 | 0.351351351 |

TABLE 3-continued

| Ratio x = A/B | Radius A | Radius B | Ratio y = B/A |
|---|---|---|---|
| 3.166666667 | 3.8 | 1.2 | 0.315789474 |
| 3.545454545 | 3.9 | 1.1 | 0.282051282 |
| 4 | 4 | 1 | 0.25 |
| 3.545454545 | 3.9 | 1.1 | 0.282051282 |
| 3.166666667 | 3.8 | 1.2 | 0.315789474 |
| 2.846153846 | 3.7 | 1.3 | 0.351351351 |
| 2.571428571 | 3.6 | 1.4 | 0.388888889 |
| 2.333333333 | 3.5 | 1.5 | 0.428571429 |
| 2.125 | 3.4 | 1.6 | 0.470588235 |
| 1.941176471 | 3.3 | 1.7 | 0.515151515 |
| 1.777777778 | 3.2 | 1.8 | 0.5625 |
| 1.631578947 | 3.1 | 1.9 | 0.612903226 |
| 1.5 | 3 | 2 | 0.666666667 |
| 1.380952381 | 2.9 | 2.1 | 0.724137931 |
| 1.272727273 | 2.8 | 2.2 | 0.785714286 |
| 1.173913043 | 2.7 | 2.3 | 0.851851852 |
| 1.083333333 | 2.6 | 2.4 | 0.923076923 |
| 1 | 2.5 | 2.5 | 1 |

TABLE 4

| Ratio x = A/B | Radius A | Radius B | Ratio y = B/A |
|---|---|---|---|
| 1 | 3 | 3 | 1 |
| 1.068965517 | 3.1 | 2.9 | 0.935483871 |
| 1.142857143 | 3.2 | 2.8 | 0.875 |
| 1.222222222 | 3.3 | 2.7 | 0.818181818 |
| 1.307692308 | 3.4 | 2.6 | 0.764705882 |
| 1.4 | 3.5 | 2.5 | 0.714285714 |
| 1.5 | 3.6 | 2.4 | 0.666666667 |
| 1.608695652 | 3.7 | 2.3 | 0.621621622 |
| 1.727272727 | 3.8 | 2.2 | 0.578947368 |
| 1.857142857 | 3.9 | 2.1 | 0.538461538 |
| 2 | 4 | 2 | 0.5 |
| 2.157894737 | 4.1 | 1.9 | 0.463414634 |
| 2.333333333 | 4.2 | 1.8 | 0.428571429 |
| 2.529411765 | 4.3 | 1.7 | 0.395348837 |
| 2.75 | 4.4 | 1.6 | 0.363636364 |
| 3 | 4.5 | 1.5 | 0.333333333 |
| 3.285714286 | 4.6 | 1.4 | 0.304347826 |
| 3.615384615 | 4.7 | 1.3 | 0.276595745 |
| 4 | 4.8 | 1.2 | 0.25 |
| 4.454545455 | 4.9 | 1.1 | 0.224489796 |
| 5 | 5 | 1 | 0.2 |
| 4.454545455 | 4.9 | 1.1 | 0.224489796 |
| 4 | 4.8 | 1.2 | 0.25 |
| 3.615384615 | 4.7 | 1.3 | 0.276595745 |
| 3.285714286 | 4.6 | 1.4 | 0.304347826 |
| 3 | 4.5 | 1.5 | 0.333333333 |
| 2.75 | 4.4 | 1.6 | 0.363636364 |
| 2.529411765 | 4.3 | 1.7 | 0.395348837 |
| 2.333333333 | 4.2 | 1.8 | 0.428571429 |
| 2.157894737 | 4.1 | 1.9 | 0.463414634 |
| 2 | 4 | 2 | 0.5 |
| 1.857142857 | 3.9 | 2.1 | 0.538461538 |
| 1.727272727 | 3.8 | 2.2 | 0.578947368 |
| 1.608695652 | 3.7 | 2.3 | 0.621621622 |
| 1.5 | 3.6 | 2.4 | 0.666666667 |
| 1.4 | 3.5 | 2.5 | 0.714285714 |
| 1.307692308 | 3.4 | 2.6 | 0.764705882 |
| 1.222222222 | 3.3 | 2.7 | 0.818181818 |
| 1.142857143 | 3.2 | 2.8 | 0.875 |
| 1.068965517 | 3.1 | 2.9 | 0.935483871 |
| 1 | 3 | 3 | 1 |

The elliptical gear 65 is keyed onto a shaft 67, mounted rotatable on a first metal box 68, attached to the stator 11. On the shaft 67 a cylindrical gear 69 is also keyed, with which another cylindrical gear 70 engages, keyed onto a shaft 71 also mounted rotatable on the box 68.

The transmission ratio between the cylindrical gears 69 and 70 is advantageously 1:1, since they only have the function of inverting the direction of rotation of the shaft 67 with respect to that of the shaft 71.

The shaft 71 is connected to the piston 22 by means of a shaft 72, mounted rotatable on the stator 11 coaxially with the axis of rotation 21, a pair of toothed pulleys 73, 74 which can be replaced by toothed wheels which exclude the belt. The toothed pulleys 73, 74 are keyed to the shafts 71, respectively 72 and a toothed belt 75. The transmission ratio $RT_2$ between the shaft 72 keyed to the piston 22 and the input shaft 71 to the group of gears 61 is predetermined and, as we said, is 2:1. In this way, the elliptical gears 65 and 66 effect two complete rotations with every complete rotation of the two pistons 22 and 23.

Since it is provided that the pistons 22 and 23 rotate only in a determinate direction of rotation, in this case clockwise in FIG. 1, a first free wheel 76, of a known type, is interposed between the shaft 72 and the stator 11 to prevent the shaft 72 and the piston 22 keyed thereon from rotating in a direction opposite to the predetermined direction.

The elliptical gear 66 is keyed onto a shaft 78 mounted rotatable on the box 68 coaxially with the shaft 71, but unconstrained by the latter so as to be able to rotate in the same direction but at independent angular velocities.

The shaft 78 is in turn connected to the piston 23 by means of a shaft 79, mounted rotatable on the stator 11 coaxially with the axis of rotation 21. In particular, a pair of toothed pulleys 80 and 81 are keyed to the shafts 78, respectively 79, and are connected to each other by a toothed belt 82. The transmission ratio $RT_3$ between the shaft 79 keyed to the piston 23 and the output shaft 78 from the group of gears 61 is equal to the transmission ration $RT_2$, that is, 2:1.

According to a variant, the two toothed pulleys 80 and 81 are replaced by toothed wheels which exclude the use of the belt.

According to a variant, not shown in the drawings, both the connection between the shafts 71 and 72, and also between the shafts 78 and 79 can be made by means of toothed wheels. According to another variant, the connection may be made by means of a chain.

A second free wheel 83, also of a known type, is interposed between the shaft 79 and the stator 11 to prevent the shaft 79 and the piston 23 keyed thereon, from rotating in a direction opposite to the predetermined one.

On the shaft 72 attached to the piston 22 another toothed pulley 85 is also keyed, which is connected, by means of a toothed belt 86, to a toothed pulley 87, in turn keyed onto a shaft 89 mounted rotatable on a second metal box 90, disposed on the opposite side of the box 68 with respect to the stator 11, to which it is attached. The second group of gears 62 is disposed in the second box 90.

The transmission ratio $RT_4$ between the pulleys 85 and 87 is equal to the transmission ratio $RT_2$ that is, 2:1.

On the shaft 89 an elliptical gear 91 is also keyed, which is the same as the elliptical gear 65 but angularly offset by 180° with respect thereto. The elliptical gear 91 in turn engages with a mating elliptical gear 92. The transmission ratio $RT_5$ between the elliptical gears 91 and 92 is the same as the transmission ratio $RT_1$ of the first pair of elliptical gears 65 and 66.

The elliptical gear 92 is keyed onto a shaft 93 mounted rotatable on the box 90 and on which a toothed pulley 95 is also keyed, connected by means of a toothed belt 96 to a toothed pulley 97 keyed to a shaft 99 mounted rotatable on brackets 100 of the stator 11.

The transmission ratio $RT_6$ between the pulleys 95 and 97 is advantageously equal to the inverse of the transmission ratio $RT_2$ and is for example 2:1.

It is clear that this kinematism with belt can be replaced in a mechanically equivalent manner by a kinematism with toothed wheels.

On the shaft 99, which is the output shaft of the engine 10, a flywheel 101 is advantageously keyed.

As we saw for the shaft 72, to the shaft 79, attached to the piston 23, a toothed pulley 105 is also keyed, which is connected, by means of a toothed belt 106, to a toothed pulley 107, in turn keyed onto a shaft 109 mounted rotatable on a third metal box 110, specular to the box 90 with respect to the central compartment 16 of the stator 11, to which it is attached. The third group of gears 63 is disposed in the box 110.

The transmission ratio $RT_7$ between the pulleys 105 and 107 is advantageously equal to the transmission ratio $RT_2$.

As with the previous kinematisms, the toothed belt 106 and the toothed pulleys 105, 107 can be replaced by a kinematism with toothed wheels On the shaft 109 an elliptical gear 111 is also keyed, which is the same as the elliptical gear 66 but angularly offset by 180° with respect thereto. The elliptical gear 111 in turn engages with a mating elliptical gear 112. The transmission ratio $RT_8$ between the elliptical gears 111 and 112 is the same as the transmission ratio $RT_1$ and $RT_5$ of the other two pairs of elliptical gears 65, 66 and 91, 92.

The elliptical gear 112 is keyed onto a shaft 113 mounted rotatable on the box 110 and on which a toothed pulley 115 is also keyed, connected by means of a toothed belt 116 to a toothed pulley 117.

In turn, the toothed pulley 117 is keyed to the output shaft 99 of the engine 10, on which a flywheel 101 is mounted. Advantageously, between the flywheel 101 and the output shaft 99 of the engine 10 a pair of toothed wheels is provided with a ratio of 1:2, to take the number of revolutions of the flywheel 101 to the same value as the number of revolutions of the pistons 22 and 23.

The engine 10 as described heretofore functions as follows.

In a first work condition, shown in FIG. 1, the pistons 22 and 23 are exactly in correspondence with the exhaust 51 and respectively the intake 50 apertures, while the chamber 33 and the relative pre-chamber 43 are in correspondence with the sparking plug 53. In the chamber 33, and in particular in the pre-chamber 43, under normal working conditions, there is a compressed mixture of air and fuel previously taken in through the feed pipe 55.

With any known means, the sparking plug 53 is made to spark. The force released by the explosion in the chamber 33 and the pre-combustion chamber 43 makes the piston 23 rotate in a clockwise direction and causes the piston 22, connected to it by the kinematism 60, to follow it, rotating in the same direction of rotation but at an angular velocity which, in the first 45°, will be reduced with respect to that of the piston 23. This is due to the couplings of the elliptical gears 65 and 66, and the greater surface of the piston 23, defined by the presence of the bevel 36.

Figure 4:
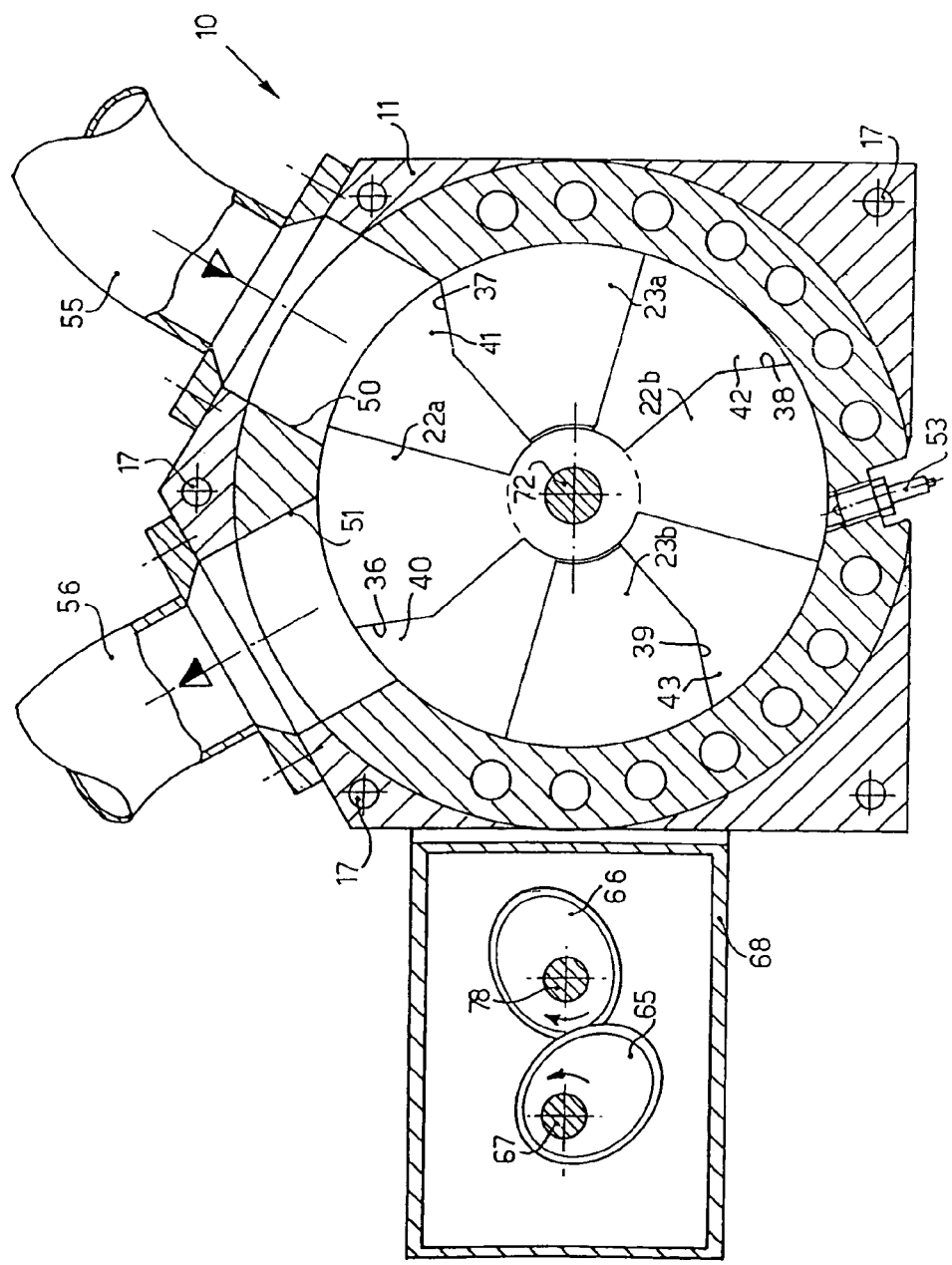
FIG. 4 is a lateral schematized view of the combustion engine in FIG. 1 in a second operating position.
Figure 5:
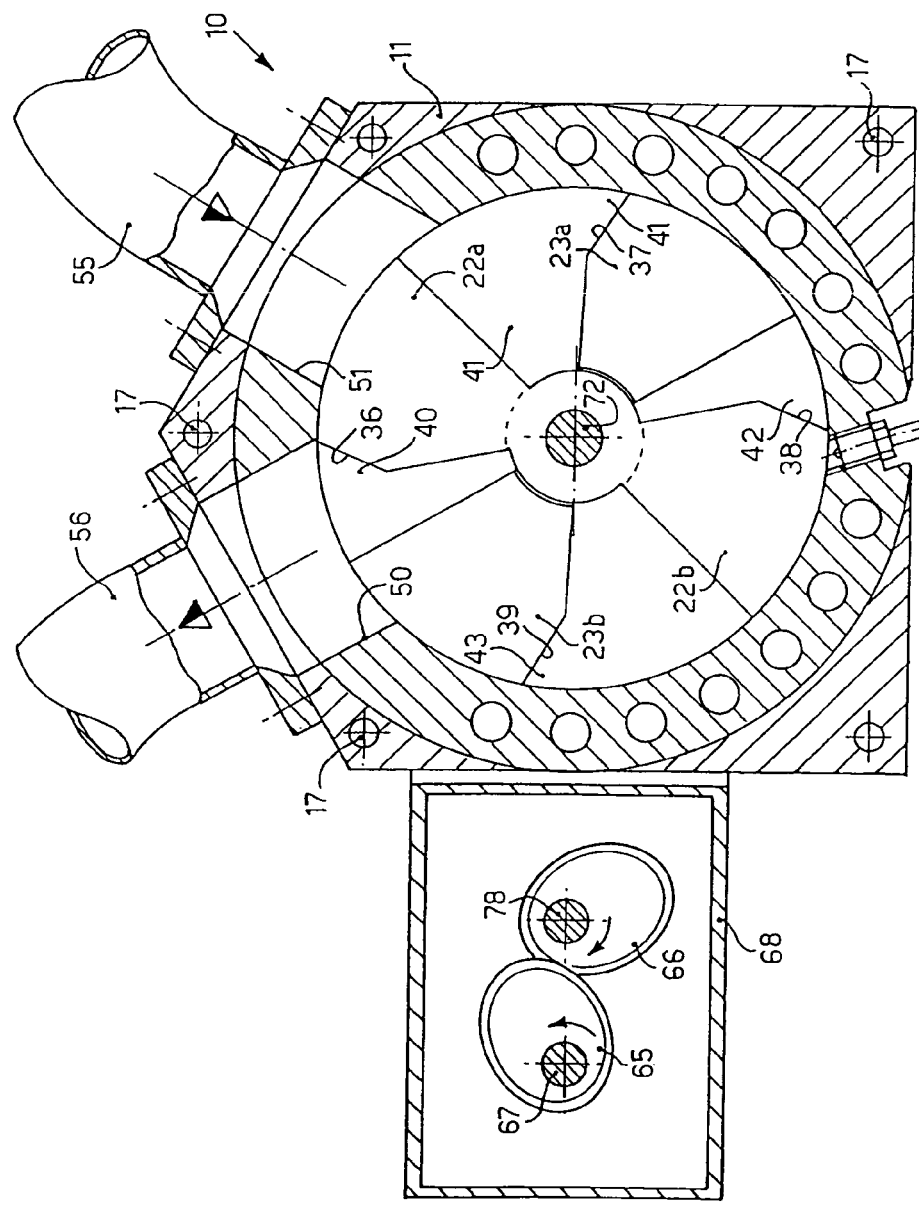
FIG. 5 is a partial front view of the combustion engine in FIG. 1 in a third operating position.
Figure 6:
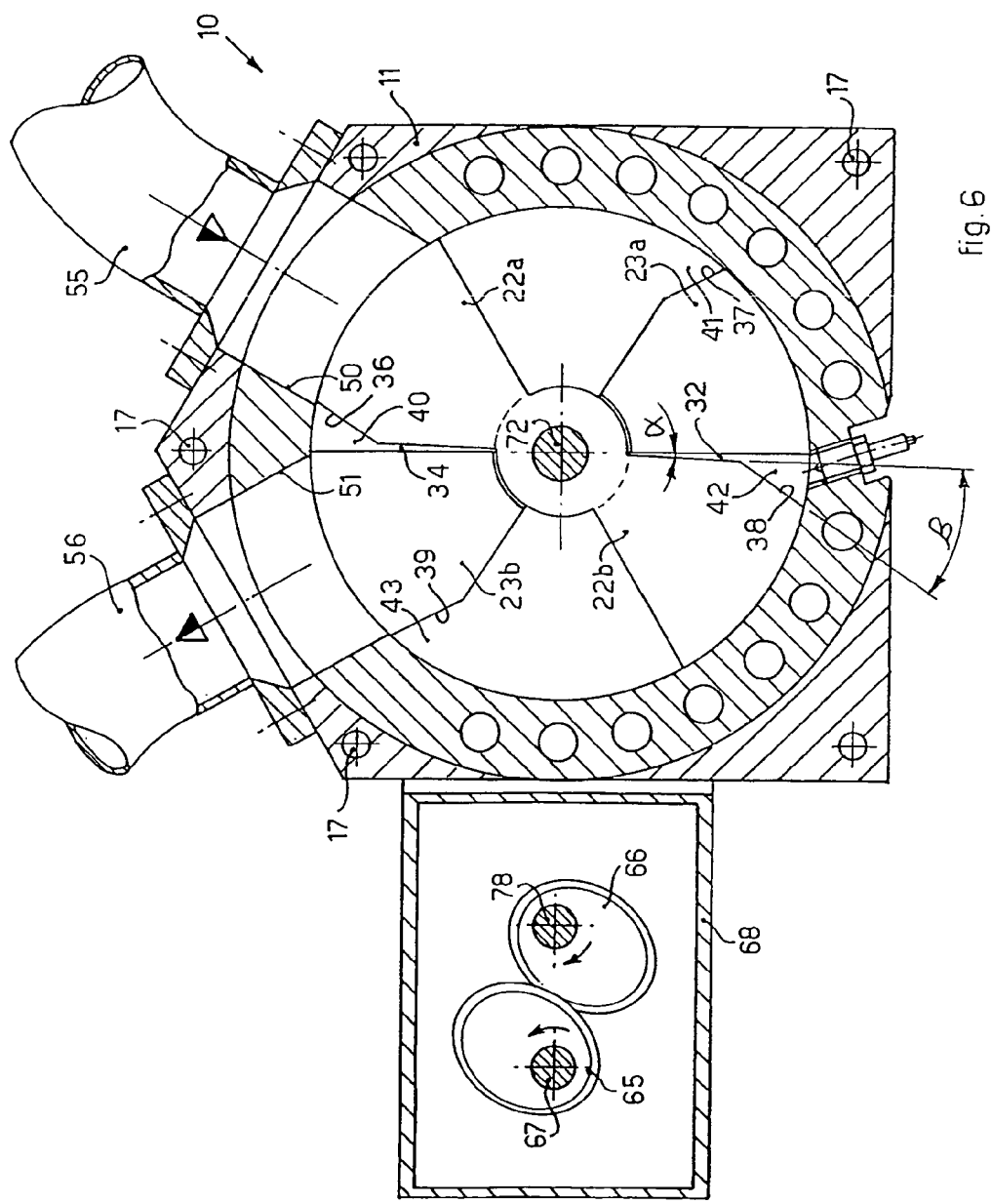
FIG. 6 is a partial front view of the combustion engine in FIG. 1 in a fourth operating position.

With the transmission ratio $RT_1$ of 1:3, while the piston 23 performs a rotation of 45°, moving to the position shown schematically in FIG. 4, the piston 22 performs at the same time a rotation of only 15°. On this point see graph in FIG. 7, which shows the development of the relative angular velocities of the pistons 22 and 23, one with respect to the other, with regard to their angular position.

In the position shown in FIG. 4, the intake aperture 50 is completely open, so that a new introduction of mixture is made into the chamber 31, between the arm 22a and the arm 23a. The chamber 33 in which the explosion has just occurred, on the contrary, is expanding. In the chamber 34 the combusted gases caused by the previous explosion are in the expulsion phase. In fact the chamber 34 is compressing and is already in communication, although partially, with the exhaust aperture 51. The chamber 32, which is contracting, compresses the mixture of air and fuel introduced previously through the aperture 50.

After a further rotation of 45° of the piston 23 (FIG. 5), the piston 23 will have completed an overall rotation of just over 30°.

In this intermediate position, the chambers 34 and 32 will have almost completed their compression, so that the combusted gases will have been almost completely expelled from the chamber 34 through the exhaust aperture 51, whereas the mixture of air and fuel will be almost completely compressed in the chamber 32 and in the relative pre-combustion chamber 42, in formation. Simultaneously, the chambers 31 and 33 will have almost completed their expansion, so that the first will be almost full of a new "load" of air-fuel mixture, whereas the latter is expanding due to the explosion which has occurred therein.

With a further rotation of 30° of the piston 23 (FIG. 6), for a total of 120° in all since the beginning of the cycle, the piston 22 will have carried out an overall rotation of just over 60°. In this position, the positions of the pistons 22 and 23 with respect to the starting position have been practically inverted. In fact, the arm 22a is in the position in which the arm 23a was initially; the arm 23a is in the position in which the arm 22b was initially; the arm 22b is in the position in which the arm 23b was initially; and the arm 23b is in the position in which the arm 22a was initially.

In this position, the sparking plug 53 is made to spark again and another cycle is repeated, identical to the one we have just described, with the difference that, for the transmission ratio $RT_1$ of the elliptical gears, which changes during their rotation, it will now be the piston 22 that will rotate at a velocity greater than that of the piston 23, also due to the effect of the pre-chamber 42 made with the bevel 16 on the arm 22b. In fact, it will now be the piston 22 that describes an arc of 120° whereas the piston 23, at the same time, will describe an arc of 60°.

Therefore, with every half revolution of the pistons 22 and 23, two complete cycles of intake, combustion and exhaust of the engine 10 will be completed.

Since 2:1 is the transmission ratio $RT_2$ between the shaft 72 keyed to the piston 22 and the input shaft 71 to the group of gears 61, a complete revolution of the elliptical gears 65 and 66 corresponds to every half revolution of the pistons 22 and 23.

The two pistons 22 and 23, alternating as follower and followed, thus achieve four complete cycles with every rotation of 360°.

The groups of gears 62 and 63, since they essentially consist of the pairs of elliptical gears 91, 92 and 111, 112, re-balance the velocities of rotation of the shafts 72 and 79 keyed to the pistons 22 and 23, so that the output shaft 99 rotates at a uniform angular velocity proportionate to the average velocity of the pistons 22 and 23.

As we have seen, the engine 10 as described heretofore can also function with a Diesel cycle, through self-ignition of the air-fuel mix (for example Diesel oil), that is, without the aid of the sparking plug 53.

With a diameter of the central compartment 16 and the pistons 22 and 23 of about 220 mm, a thickness of about 50 mm and an angle of about 60° maximum expansion of each of the chambers 40-43, the engine 10 according to the invention has a usable capacity of about 1173 cm$^3$.

Figure 8:
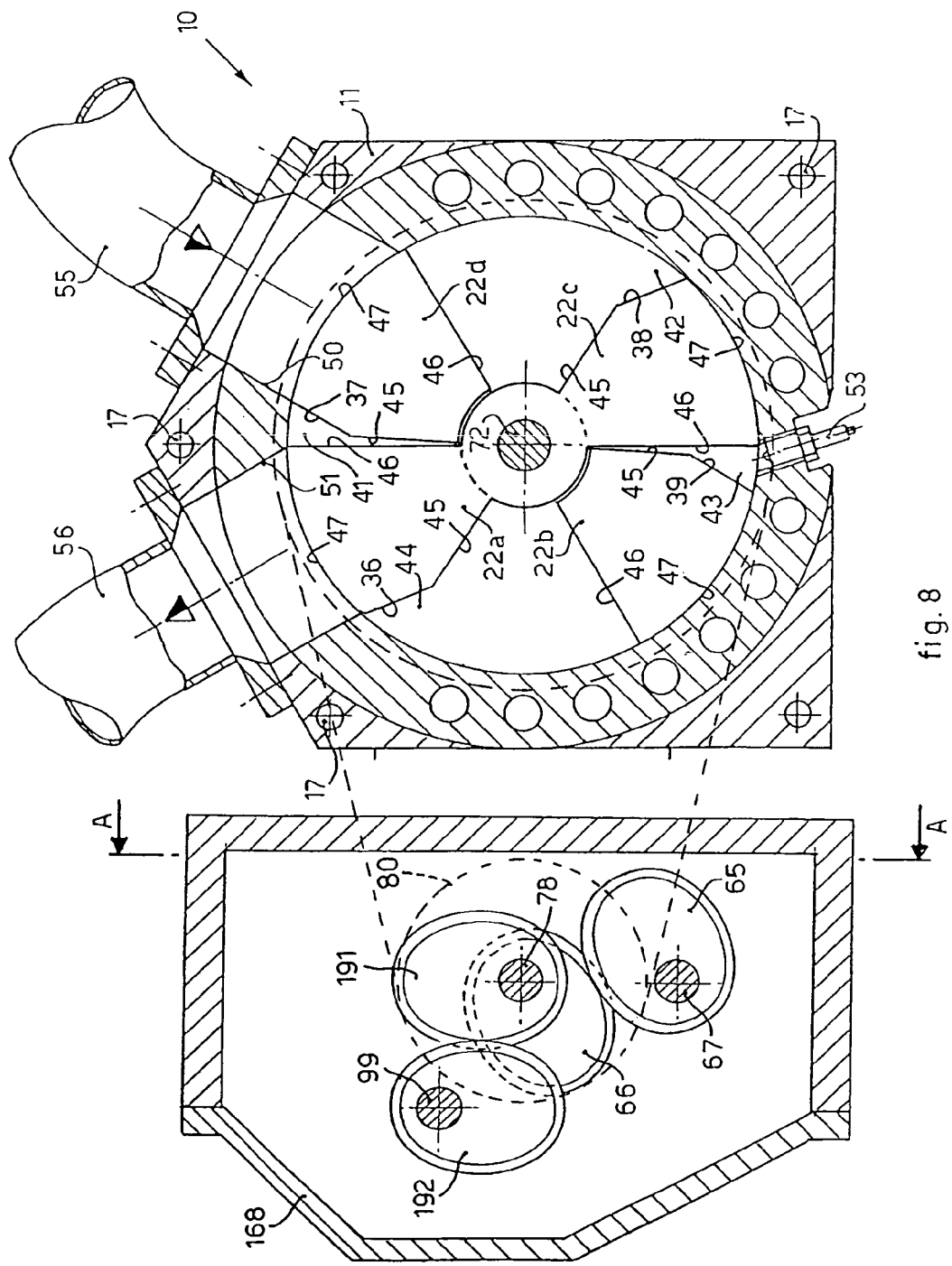
FIG. 8 is a first front view, schematized and partly in section, of a variant of the combustion engine in FIG. 1.
Figure 9:
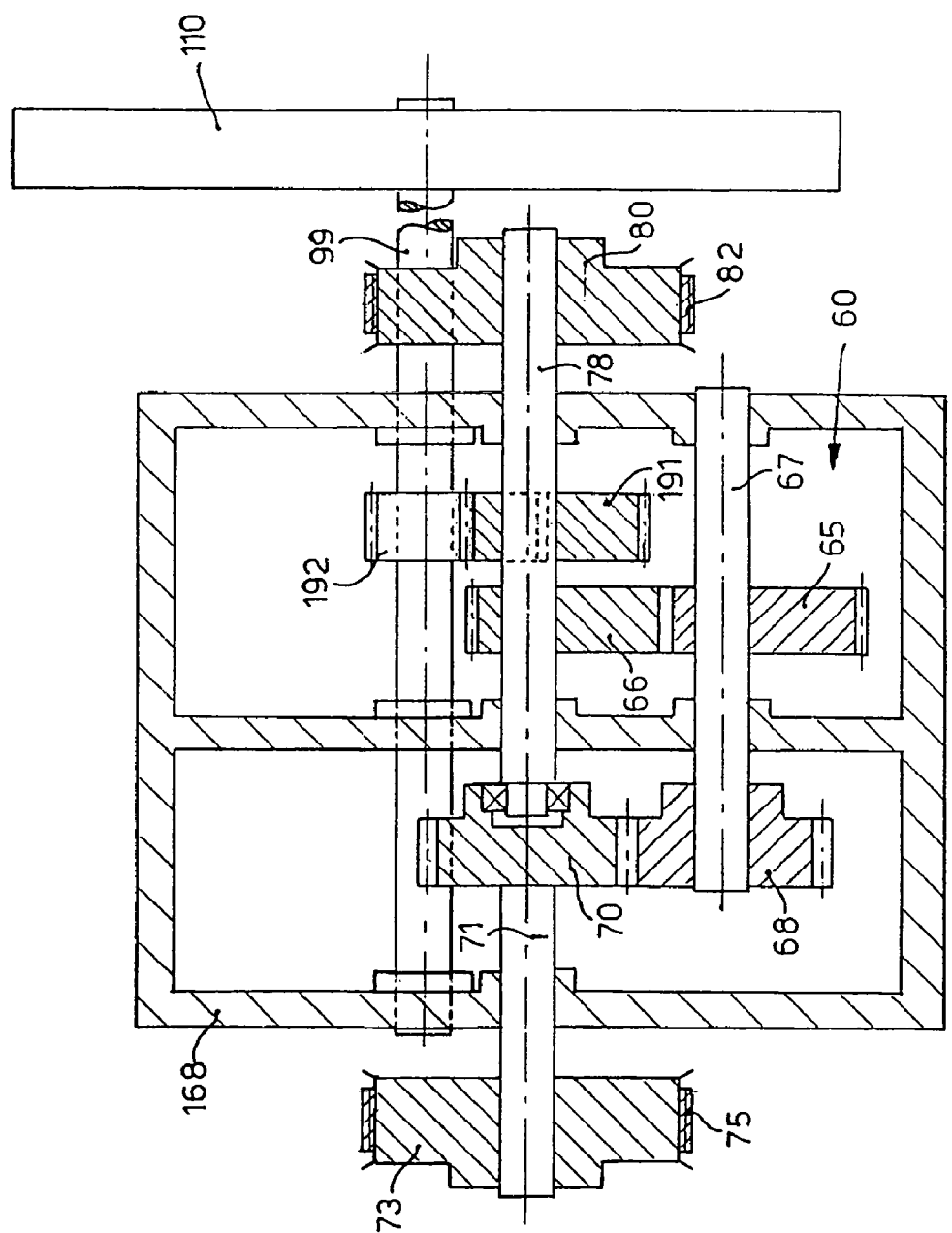
FIG. 9 is a section from A to A of FIG. 8.

According to a variant shown in FIGS. 8 and 9, the group of gears that constitutes the kinematic 60 is all grouped into a single box 168 disposed on one side of the stator 11 and attached thereto.

In this variant the elliptical gears 91 and 92 are replaced by two corresponding elliptical gears 191 and 192 which are keyed, one directly onto the shaft 71, connected to the piston 22, and the other onto the output shaft 99, on which the flywheel 110 is keyed. In this case the output shaft 99 is mounted rotatable on the same box 168.

In particular, the shafts 71 and 78 and the shaft 67 have their respective axes of rotation substantially parallel and disposed on a single vertical plane, whereas the shaft 99 of the flywheel 110 has its axis of rotation substantially parallel to the axis of rotation of the shafts 71 and 78 on a plane inclined by about 60° with respect to said vertical plane. This reciprocal disposition of the shafts 67, 71, 78 and 99 allows a correct kinematic relationship between the elliptical wheels 191, 192 and 65, 66, guaranteeing not only the rebalancing of the velocities of reciprocal rotation of the shafts but also the correct ratios of acceleration and deceleration of the pistons 22 and 23.

Figure 12:
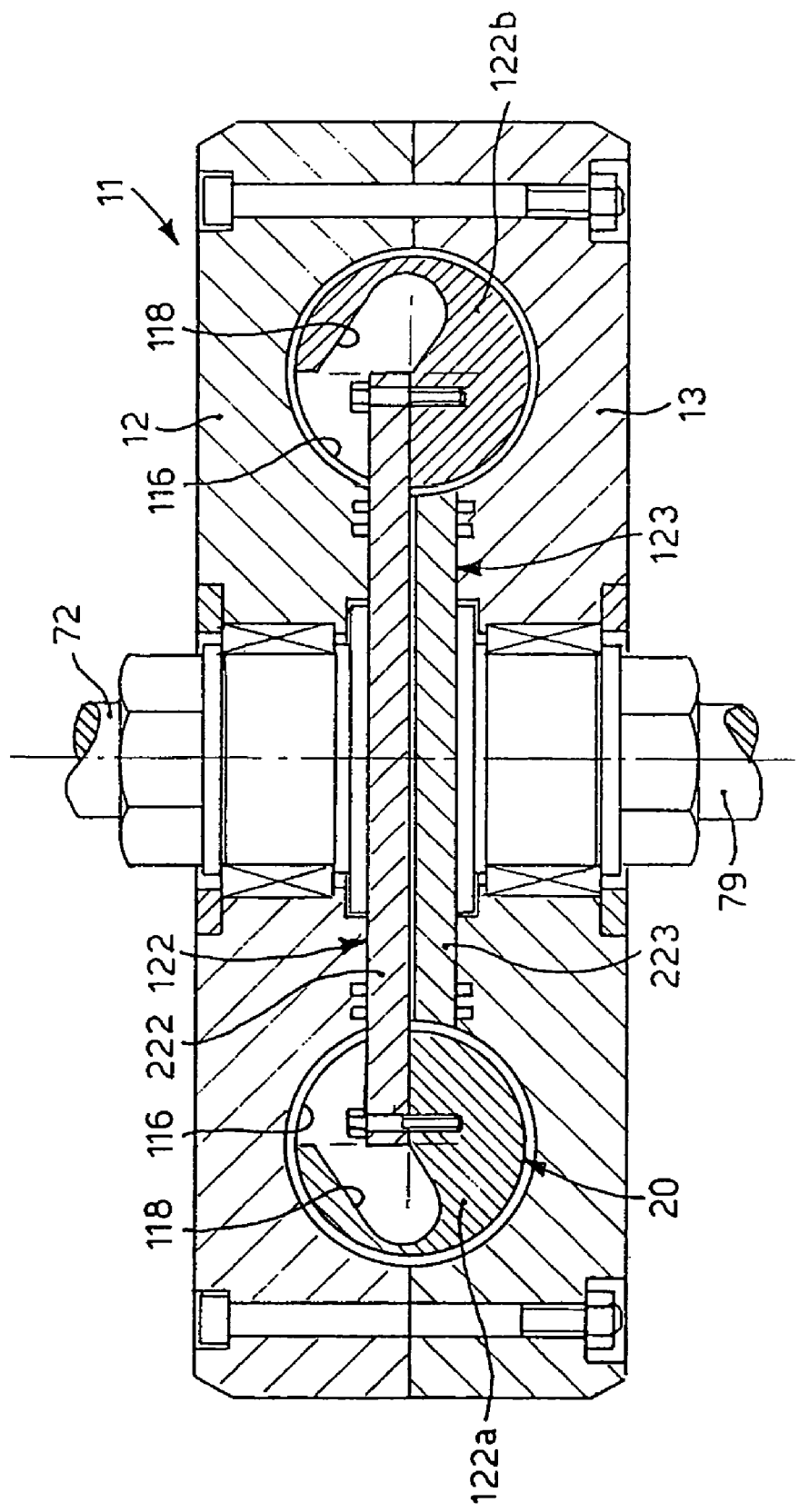
FIG. 12 is a third form of embodiment of the combustion engine according to the present invention.

According to the form of embodiment shown in FIG. 12, the two lateral flanges 12 and 13 of the stator 11 are shaped so as to define a toroidal compartment 116, in which the two metal pistons 122 and 123 of the rotor 20 are rotatably mounted.

In this case, each metal piston 122 and 123 comprises respective radial arms of which only those indicated with the reference numbers 122a and 122b are visible in the drawings, conformed as a toroidal portion, so as to be able to slide in the toroidal compartment 116, and two central disks 222 and 223, each keyed to the respective shaft 72, 79, and on which the respective radial arms 122a and 122b are peripherally mounted.

It is clear that what has been described heretofore and hereafter for the radial arms 122a and 122b mounted on the central disk 222 is to be considered equally valid for the radial arms mounted on the central disk 223.

In this solution too, each radial arm 122a, 122b comprises a first surface provided with a bevel which, in cooperation with a second surface of an adjacent radial arm, defines respective combustion pre-chambers, not shown here.

In particular, each radial arm 122a, 122b has a groove 118, suitable to allow the assembly of the arm to the respective central disk 222 and 223 and, in use, to allow the lubrication and cooling fluid to flow therein.

Figure 13:
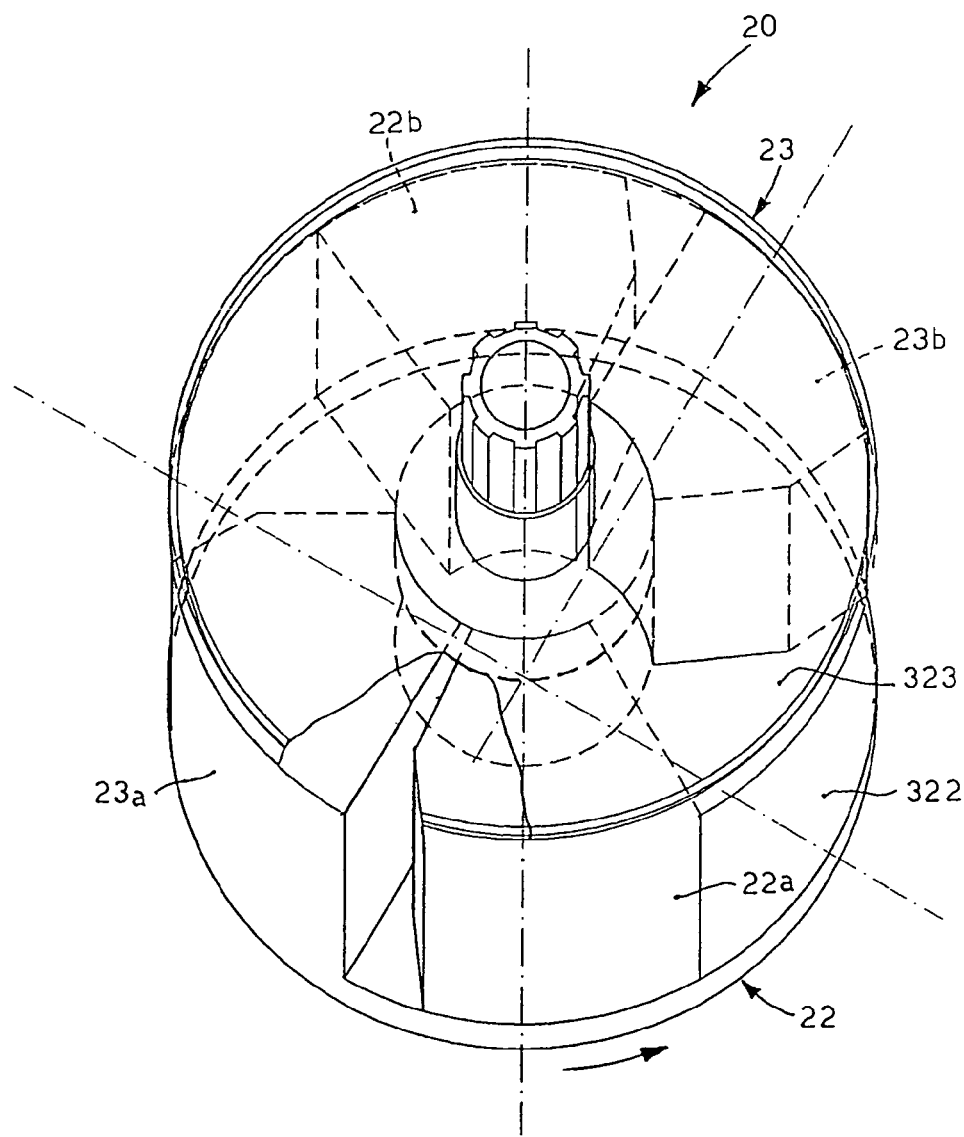
FIG. 13 is a fourth form of embodiment of the combustion engine according to the present invention.

According to the variant shown in FIG. 13, each radial arm 22a, 22b, 23a, 23b of the rotor 20 extends directly from a surface of a relative rotary disk 322, 323, mounted rotatable inside the cylindrical compartment 16 of the stator 11.

It is clear that modifications and/or additions of parts may be made to the combustion engine 10 as described heretofore, without departing from the field and scope of the present invention. It is also clear that, although the present invention has been described with reference to a specific example, a person of skill in the art shall certainly be able to achieve many other forms of combustion engine equivalent to the one described, all coming within the field of protection defined by the present invention.

The invention claimed is:
1. A combustion engine comprising:
a stator (11) provided with a compartment (16, 116),
a rotor (20) being mounted rotatable in a stator kinematism (60),
a combustion pre-chamber (40, 41, 42, 43), an intake aperture (50) for delivering an air/air-fuel mixture, and an exhaust aperture (51), wherein said rotor (20) further comprises a first san axis of rotation (21) coaxial with said compartment (16, 116), wherein said first piston and said second piston (22, 23, 122, 123) further comprises:

at least a peripheral surface (47) being articulated one with respect to the other, wherein said stator kinematism (60) are provided to coordinate cyclically the rotations of said first piston and said second piston (22, 23, 122, 123) around said axis of rotation (21) to synchronously accelerate or decelerate with respect to the other in the same direction and at the same average angular velocity, at least a first radial arm (22a, 23a, 22b, 23b, 122a, 122b) provided with a first lateral surface (45) orthogonal to the plane of rotation, cooperating cyclically with a corresponding second lateral surface (46), also orthogonal to the plane of rotation, a second adjacent radial arm (22a, 23a, 22b, 23b, 122a, 122b) and said at least the first radial arm (22a, 23a, 22b, 23b, 122a, 122b) defining a combustion chamber (31, 32, 33, 34), and wherein said first lateral surface (45) comprises a bevel (36, 37, 38, 39) oriented in a rotational direction, to define, with the second lateral surface (46) of the adjacent radial arm (22a, 23a, 22b, 23b, 122a, 122b), and wherein said combustion pre-chamber (40, 41, 42, 43) continuously cooperates with the combustion chamber (31, 32, 33, 34), and wherein said stator kinematism (60) comprises:

at least a first pair of elliptical gears (65, 66), with a transmission ratio (RTi) which is variable within a complete revolution of the first pair of said elliptical gears at a ratio 1:3 to 3:1 in order to make said first piston and said second piston (22, 23, 122, 123) of said rotor (20) to accelerate or decelerate cyclically, wherein a first elliptical gear (65) of the first pair of said elliptical gears is keyed in to a first shaft (67) to which a first cylindrical gear (69) is also keyed, wherein said first cylindrical gear (69) engages a second cylindrical gear (70) that is keyed onto a second shaft (71), wherein said first and second cylindrical gears (69, 70) invert a rotational direction of said first shaft (67) with respect to said second shaft (71) which is connected to the first piston by a third shaft (72), wherein a transmission ratio between the third shaft (72) and the first piston (22, 122) being 2:1 so that the first pair of elliptical gears (65, 66) effects two complete rotations with every complete rotation of the first piston (22, 122) and a second piston (23, 123), and at least a second pair of elliptical gears (91, 92, 191, 192) associated with said first pair of said elliptical gears (65, 66), wherein at least one elliptical gear of said second pair of said elliptical gears is connected with an output shaft (99) of the engine, to rebalance a rotational speed of said first piston and said second piston to be continuous and proportionate to an average rotational speed of said first piston and said second piston (22, 23, 122, 123).

2. The combustion engine as defined in claim 1, characterized in that the bevel (36, 37, 38, 39) is made in correspondence with an external edge defined between the first lateral surface (46) and the peripheral surface (47) of the relative radial arm (22a, 23a, 22b, 23b, 122a, 122b), wherein said stator kinematism further comprises:

a third pair of elliptical gears (111,112), associated said first pair of said elliptical gears (65, 66) and said second pair of said elliptical gears (91, 92), and said third pair of said elliptical gears (111,112) being both connected to said output shaft (99) of the engine and having a first freewheel (76) interposed between the third shaft (72) and the stator (11) to prevent the third shaft (72) and the first piston (22,122) from rotating in a direction opposite to a predetermined direction said second piston (23) being keyed to a fourth shaft (79) where a transmission ratio between said fourth shaft (79) and an output shaft (78) from said first pairs of said elliptical gears, said second pairs of said elliptical gears and said third pairs of said elliptical gears is equal to 2:1.

3. The combustion engine as defined in claim 1, characterized in that the bevel (36, 37, 38, 39) has an angular profile equal to an angle β comprised between about 25° and about 45°.

4. The combustion engine as defined in claim 1, characterized in that the bevel (36, 37, 38, 39) has an angular profile equal to an angle β comprised about 31°.

5. The combustion engine as defined in claim 1, characterized in that the bevel (36, 37, 38, 39) extends along the whole height of the thickness of the relative radial arm (22a, 23a, 22b, 23b, 122a, 122b).

6. The combustion engine as defined in claim 1, characterized in that the bevel (36, 37, 38, 39) defines a compression ratio of 1:10 between the combustion phase and the phase of maximum expansion.

7. The combustion engine as defined in claim 1, characterized in that the bevel (36, 37, 38, 39) has a linear development.

8. The combustion engine as defined in any claim from 1 to 6, characterized in that the bevel (36, 37, 38, 39) has a curvilinear development.

9. The combustion engine as defined in claim 8, characterized in that the bevel (36, 37, 38, 39) is concave.

10. The combustion engine as defined in claim 8, characterized in that the bevel (36, 37, 38, 39) is convex.

11. The combustion engine as defined in claim 1, characterized in that the combustion chamber (31, 32, 33, 34), in the compressed condition, has an aperture equal to an angle α comprised between about 2° and about 10°.

12. The combustion engine as defined in claim 1, characterized in that the combustion chamber (31, 32, 33, 34), in the compressed condition, has an aperture equal to about 6°.

13. The combustion engine as defined in claim 1, characterized in that the radial arms (22a, 23a, 22b, 23b, 122a, 122b) have a reciprocal angular position with respect to the angular combustion point, to define, in the combustion phase, a determinate angle of spark lead.

14. The combustion engine as defined in claim 13, characterized in that for a first radial arm the angle of spark lead is comprised between about −22° and about −7°, and for a second radial arm the angle of spark lead is comprised between about −15° and about −8°, with respect to the angular combustion point.

15. The combustion engine as defined in claim 13, characterized in that the angle of spark lead of each radial arm (22a, 23a, 22b, 23b, 122a, 122b) is variable according to the number of revs of the engine (10).

16. The combustion engine as defined in claim 1, characterized in that it comprises a sparking plug (53) mounted on the stator (11) inclined by an angle comprised between about 20° and about 30° with respect to a plane orthogonal to the rotation and passing through the center of rotation and the angular combustion point.

17. The combustion engine as defined in claim 16, characterized in that the sparking plug (53) is inclined by about 25°.

18. The combustion engine as defined in claim 1, characterized in that said two parts of the rotor (20) comprise a first piston (22) and respectively a second piston (23), angularly offset with respect to said first piston (22), said first (22) and said second piston (23) being disposed cross-wise, so that at least their radial arms (22a, 22b; 23a, 23b) lie on the same plane perpendicular to said axis of rotation (21).

19. The combustion engine as defined in claim 18, characterized in that said first piston and said second piston (22, 23) are the same length at a line passed longitudinally through a center of first piston and said second piston.

20. The combustion engine as defined in claim 18, characterized in that the length of said first piston and said second piston (22, 23) is equal to a diameter of said compartment (16).

21. The combustion engine as defined in claim 18, characterized in that said first piston and said second piston (22, 23) comprises a central part (22c, 23 c) which allows said first piston and said second piston to pivot on said axis of rotation (21), and from which said radial arms (22a, 22b; 23a, 23b) extend, on diametrically opposite sides.

22. The combustion engine as defined in claim 18, characterized in that said radial arms (22a, 22b; 23a, 23b) are coplanar with respect to each other and lie on a transverse plane orthogonal to said axis of rotation (21), a thickness of each of said arms (22a, 22b; 23a, 23b) being equal to a width of said central compartment (16).

23. The combustion engine as defined in claim 18, characterized in that said radial arms (22a, 22b; 23a, 23b) define four corresponding combustion chambers (31, 32, 33, 34) and four combustion pre-chambers (40, 41, 42, 43) to compress and expand cyclically during one complete rotation of said pistons (22, 23).

24. The combustion engine as defined in claim 23, characterized in that into each of said four combustion chambers (31, 32, 33, 34) and four combustion pre-chambers (40, 41, 42, 43) a mixture of air and fuel is to be introduced, to be subsequently made to combust, with or without the aid of a sparking plug (53), and in that from each of said four combustion chambers (31, 32, 33, 34) and four combustion pre-chambers (40, 41, 42, 43) the combusted gases caused by the corresponding combustion are to be discharged.

25. The combustion engine as defined in claim 23, characterized in that in every complete rotation of said rotor (20) four complete cycles of intake, combustion, expansion and exhaust are obtained.

26. The combustion engine as defined in claim 18, characterized in that the peripheral walls of said radial arms (22a, 22b; 23a, 23b) are to cooperate cyclically with at least an intake aperture (50) and at least an exhaust aperture (51), so that said radial arms also function as intake and exhaust valves.

27. The combustion engine as defined in claim 1, characterized in that said stator kinematism (60) comprise a plurality of gears (61, 62 and 63) mounted rotatable in a corresponding box (68, 90, 110) attached to said stator (11) externally to said compartment (16).

28. The combustion engine as defined in claim 1, characterized in that the compartment (116) of the stator (11) is toroidal in shape.

29. The combustion engine as defined in claim 28, characterized in that the respective radial arms (122a, 122b and 123a, 123b) of each metal piston (122 and 123) are conformed as a toroidal portion to slide in the compartment (116), and are supported rotationally by a central disk (222, 223), keyed to a respective shaft (72, 79).

30. The combustion engine as defined in claim 29, characterized in that each radial arm (122a, 122b, 123a, 123b) comprises a groove (118) suitable to allow to assemble the arm to the respective central disk (222, 223) and, in use, to allow a lubrication and cooling fluid to flow therein.

31. The combustion engine as defined in claim 1, characterized in that each radial arm (22a, 22b, 23a, 23b) extends directly from a surface of a relative rotary disk (322, 323), mounted rotatable inside the cylindrical compartment (16) of the stator (11).

\* \* \* \* \*